United States Patent
Ji et al.

(10) Patent No.: US 12,438,606 B2
(45) Date of Patent: Oct. 7, 2025

(54) MOBILITY MANAGEMENT IN A NON-TERRESTRIAL NETWORK

(71) Applicant: QUALCOMM Incorporated, San Diego, CA (US)

(72) Inventors: Lianghai Ji, San Diego, CA (US); Jun Ma, San Diego, CA (US); Liangping Ma, San Diego, CA (US); Mohamad Sayed Hassan, Paris (FR); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/151,844

(22) Filed: Jan. 9, 2023

(65) Prior Publication Data

US 2024/0235664 A1    Jul. 11, 2024

(51) Int. Cl.
*H04B 7/185* (2006.01)
(52) U.S. Cl.
CPC ..... *H04B 7/18545* (2013.01); *H04B 7/18541* (2013.01); *H04B 7/18589* (2013.01)
(58) Field of Classification Search
None
See application file for complete search history.

(56) References Cited

U.S. PATENT DOCUMENTS

2024/0022984 A1*  1/2024  Åström .............. H04B 7/18541

FOREIGN PATENT DOCUMENTS

WO    2022086412 A1    4/2022

OTHER PUBLICATIONS

International Search Report and Written Opinion—PCT/US2023/082511—ISA/EPO—Mar. 25, 2024.
Panasonic: "Enhancements on UL Time and Frequency Synchronization", 3GPP TSG RAN WG1 #108-e, R1-2201387, 3rd Generation Partnership Project, Mobile Competence Centre, 650, Route Des Lucioles, F-06921 Sophia-Antipolis Cedex, France, vol. RAN WG1, No. E-meeting, Feb. 21, 2022-Mar. 3, 2022, Feb. 14, 2022, pp. 1-16, XP052109446, Section 1-5,7.
Panasonic: "Maintenance on Solutions for NR to Support Non-terrestrial Networks (NTN)", 3GPP TSG RAN WG1 #109-e, R1-2203289, 3rd Generation Partnership Project, Mobile Competence Centre, 650, Route Des Lucioles, F-06921 Sophia-Antipolis Cedex, France, vol. RAN WG1, No. E-meeting, May 9, 2022-May 20, 2022, Apr. 22, 2022, pp. 1-7, XP052137235, Sections 2-6, Figures 1,3.

* cited by examiner

*Primary Examiner* — Willie J Daniel, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive, from a first network node, a first indication of satellite assistance information that is associated with a second network node, a second indication of first timing information that is associated with the satellite assistance information, and a third indication of second timing information that is associated with the satellite assistance information. The UE may transmit an uplink signal to the second network node based at least in part on validating the satellite assistance information using the second timing information. Numerous other aspects are described.

30 Claims, 9 Drawing Sheets

MOBILITY MANAGEMENT IN A NON-TERRESTRIAL NETWORK

FIELD OF THE DISCLOSURE

Aspects of the present disclosure generally relate to wireless communication and to techniques and apparatuses for mobility management in a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a first network node, a first indication of satellite assistance information that is associated with a second network node, a second indication of first timing information that is associated with the satellite assistance information, and a third indication of second timing information that is associated with the satellite assistance information. The method may include transmitting an uplink signal to the second network node based at least in part on validating the satellite assistance information using the second timing information.

Some aspects described herein relate to a method of wireless communication performed by a first network node. The method may include transmitting a first indication of satellite assistance information that is associated with a second network node, a second indication of first timing information that is associated with the satellite assistance information, and a third indication of second timing information that is associated with the satellite assistance information. The method may include performing a handover of a UE to the second network node based at least in part on the second timing information and the satellite assistance information associated with the second network node.

Some aspects described herein relate to an apparatus for wireless communication at a UE. The apparatus may include a memory and one or more processors coupled to the memory. The one or more processors may be configured to receive, from a first network node, a first indication of satellite assistance information that is associated with a second network node, a second indication of first timing information that is associated with the satellite assistance information, and a third indication of second timing information that is associated with the satellite assistance information. The one or more processors may be configured to transmit an uplink signal to the second network node based at least in part on validating the satellite assistance information using the second timing information.

Some aspects described herein relate to an apparatus for wireless communication at a network node. The apparatus may include a memory and one or more processors coupled to the memory. The one or more processors may be configured to transmit a first indication of satellite assistance information that is associated with a second network node, a second indication of first timing information that is associated with the satellite assistance information, and a third indication of second timing information that is associated with the satellite assistance information. The one or more processors may be configured to perform a handover of a UE to the second network node based at least in part on the second timing information and the satellite assistance information associated with the second network node.

Some aspects described herein relate to a non-transitory computer-readable medium that stores a set of instructions for wireless communication by a UE. The set of instructions, when executed by one or more processors of the UE, may cause the UE to receive, from a first network node, a first indication of satellite assistance information that is associated with a second network node, a second indication of first timing information that is associated with the satellite assistance information, and a third indication of second timing information that is associated with the satellite assistance information. The set of instructions, when executed by one or more processors of the UE, may cause the UE to transmit an uplink signal to the second network node based at least in part on validating the satellite assistance information using the second timing information.

Some aspects described herein relate to a non-transitory computer-readable medium that stores a set of instructions for wireless communication by a network node. The set of instructions, when executed by one or more processors of the network node, may cause the network node to transmit a first indication of satellite assistance information that is associated with a second network node, a second indication of first timing information that is associated with the satellite assistance information, and a third indication of second timing information that is associated with the satellite assistance information. The set of instructions, when executed by one or more processors of the network node, may cause the network node to perform a handover of a UE to the second network node based at least in part on the second timing information and the satellite assistance information associated with the second network node.

Some aspects described herein relate to an apparatus for wireless communication. The apparatus may include means for receiving, from a first network node, a first indication of satellite assistance information that is associated with a second network node, a second indication of first timing information that is associated with the satellite assistance information, and a third indication of second timing information that is associated with the satellite assistance information. The apparatus may include means for transmitting an uplink signal to the second network node based at least in part on validating the satellite assistance information using the second timing information.

Some aspects described herein relate to an apparatus for wireless communication. The apparatus may include means for transmitting a first indication of satellite assistance information that is associated with a second network node, a second indication of first timing information that is associated with the satellite assistance information, and a third indication of second timing information that is associated with the satellite assistance information. The apparatus may include means for performing a handover of a UE from a first (serving) network node to the second (target) network node based at least in part on the second timing information and the satellite assistance information associated with the second network node.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
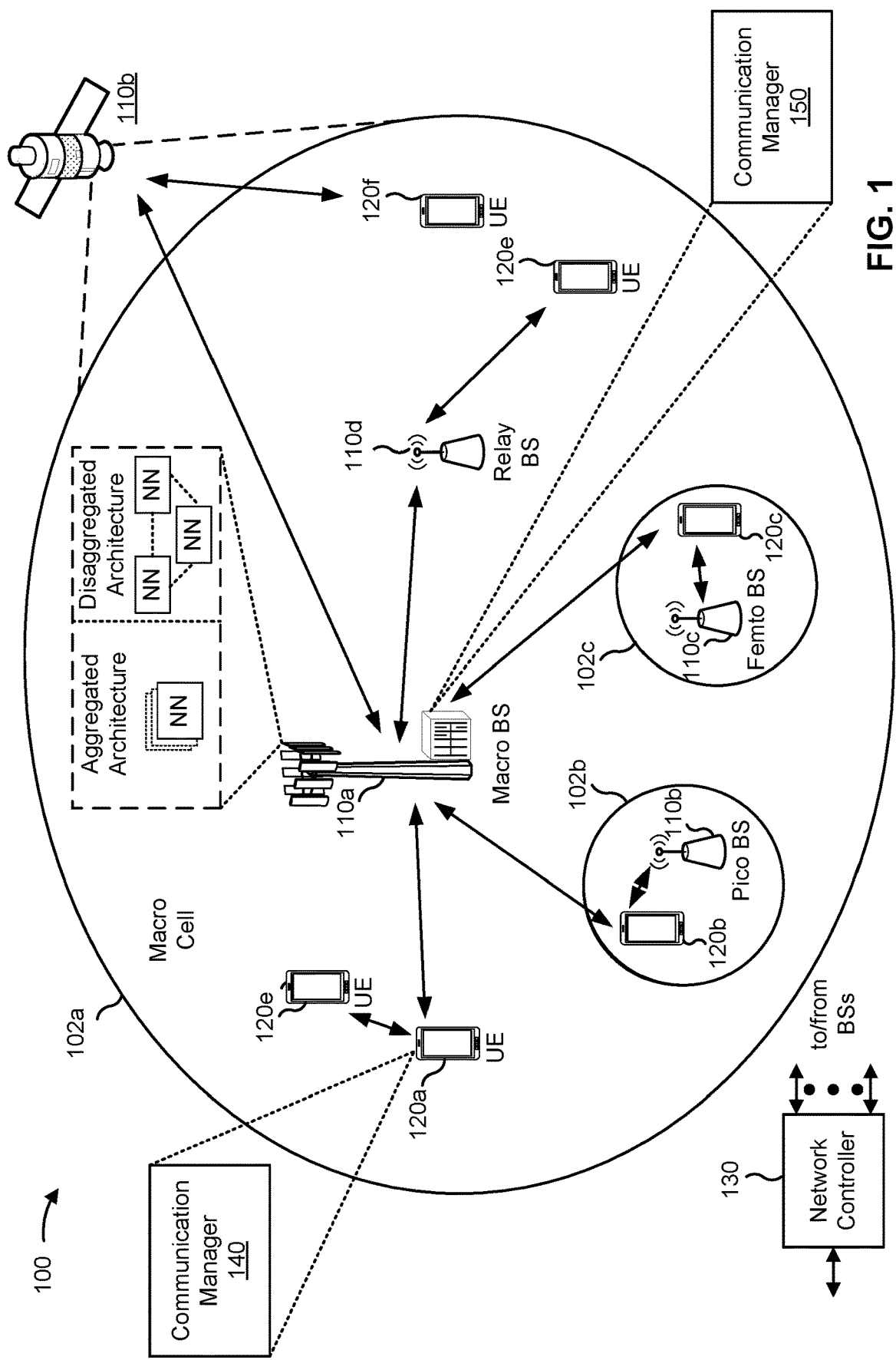
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

In some examples, and as shown by FIG. 1, a cell may be provided by the non-terrestrial network node 110b of a non-terrestrial network (NTN). The non-terrestrial network node 110b may also be referred to as a non-terrestrial base station or a non-terrestrial access point. "NTN" may denote a network that may be accessed based at least in part on a non-terrestrial network node (e.g., the non-terrestrial network node 110b). In some NTN deployments, the non-terrestrial network node 110b may be located on an airborne platform or a platform in orbit. Examples of such platforms include a satellite (e.g., a low earth orbit (LEO) satellite, a medium earth orbit (MEO) satellite, and/or a geostationary orbit (GEO) satellite), a balloon, a dirigible, an airplane, an unmanned aerial vehicle (UAV), and/or a drone.

Alternatively or additionally, in some NTN deployments (e.g., a transparent architecture or a bent pipe architecture), the non-terrestrial network node 110b may act as a relay station to relay communications between a UE 120 and the terrestrial network node 110a (e.g., a terrestrial base station located on the ground or on a tower). In this case, the non-terrestrial network node 110b may perform frequency translation and/or radio frequency amplification for communications relayed between the UE 120 and the terrestrial network node 110a. For example, the UE 120 may transmit an uplink communication to the non-terrestrial network node 110b, which may relay the uplink communication to the terrestrial network node 110a (e.g., after performing frequency translation and/or radio frequency amplification). The terrestrial network node 110a may perform additional processing on the uplink communication and/or may transmit the uplink communication to a core network. As another example, the terrestrial network node 110a may transmit a downlink communication to the non-terrestrial network node 110b, which may relay the downlink communication to the UE 120 (e.g., after performing frequency translation and/or radio frequency amplification). In some aspects, a UE 120 and/or the terrestrial network node 110a may be referred to as a ground station (GS).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive, from a first network node, a first indication of satellite assistance information that is associated with a second network node, a second indication of first timing information that is associated with the satellite assistance information, and a third indication of second timing information that is associated with the satellite assistance information; and transmit an uplink signal to the second network node based at least in part on validating the satellite assistance information using the second timing information. Additionally, or alternatively, the communication manager 140 may perform one or more other operations described herein.

In some aspects, a network node (e.g., the network node 110) may include a communication manager 150. As described in more detail elsewhere herein, the communication manager 150 may transmit a first indication of satellite assistance information that is associated with a second network node, a second indication of first timing information that is associated with the satellite assistance information, and a third indication of second timing information that is associated with the satellite assistance information; and perform a handover of a UE to the second network node based at least in part on the second timing information and the satellite assistance information associated with the second network node. Additionally, or alternatively, the communication manager 150 may perform one or more other operations described herein.

As indicated above, FIG. 1 is provided as an example. Other examples may differ from what is described with regard to FIG. 1.

Figure 2:
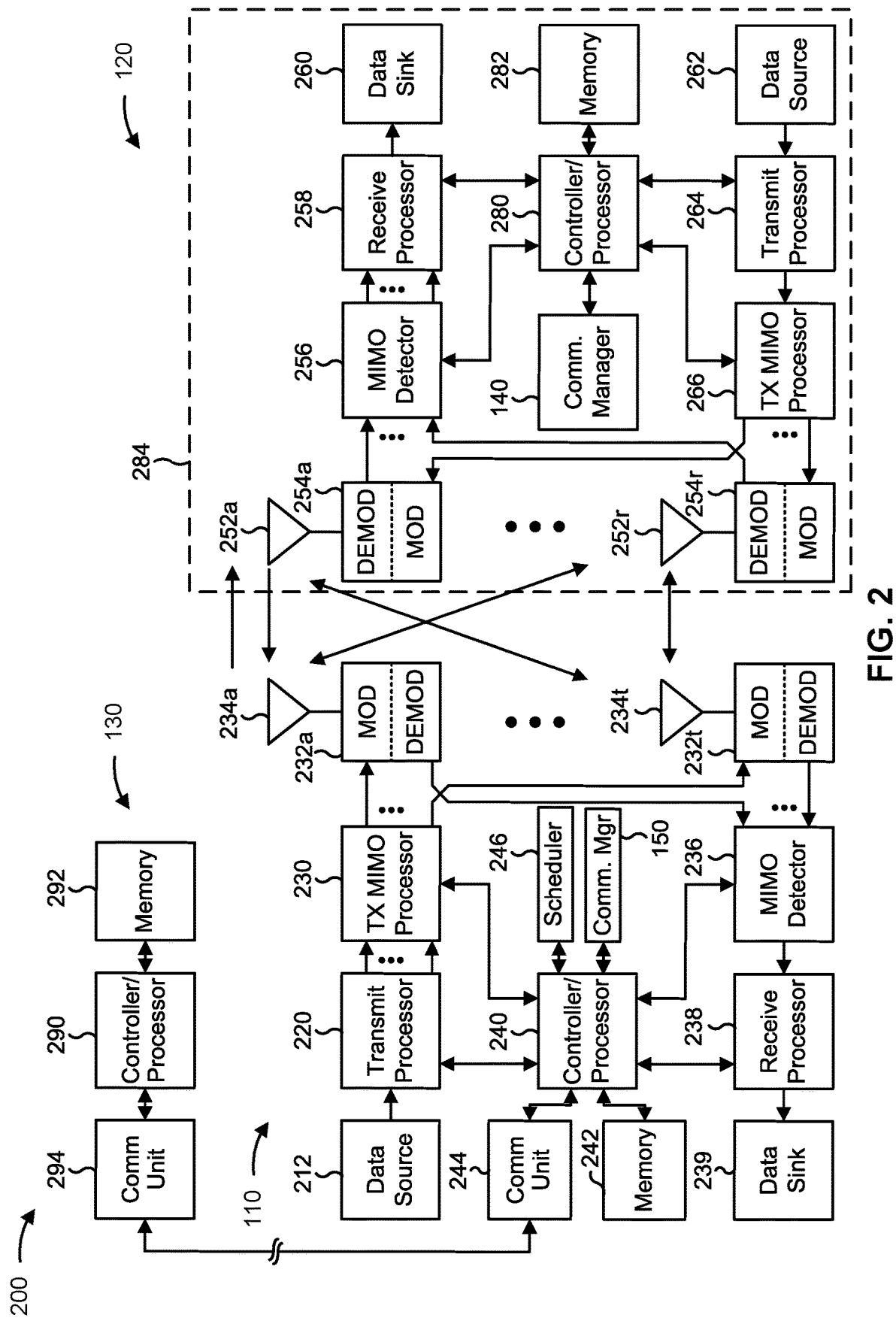
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the network node 110, the controller/processor 280 of the UE 120, and/or any other component(s) of FIG. 2 may perform one or more techniques associated with for mobility management in an NTN, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a first network node, a first indication of satellite assistance information that is associated with a second network node, a second indication of first timing information that is associated with the satellite assistance information, and a third indication of second timing information that is associated with the satellite assistance information; and/or means for transmitting an uplink signal to the second network node based at least in part on validating the satellite assistance information using the second timing information. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a first indication of satellite assistance information that is associated with a second network node, a second indication of first timing information that is associated with the satellite assistance information, and a third indication of second timing information that is associated with the satellite assistance information; and/or means for performing a handover of a UE to the second network node based at least in part on the second timing information and the satellite assistance information associated with the second network node. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
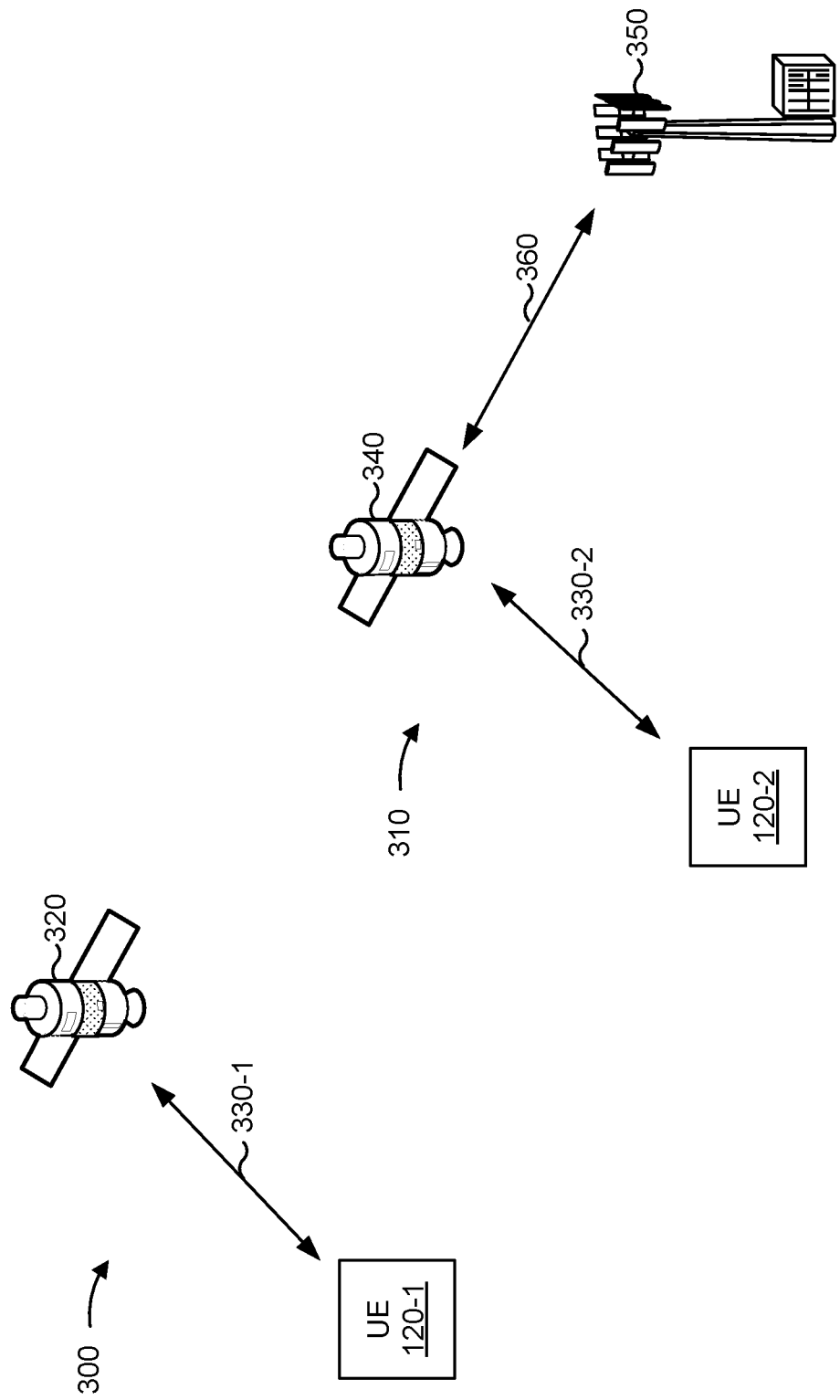
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in a non-terrestrial network.

Example 300 shows a regenerative satellite deployment in which a first UE 120-1 is served by a satellite 320 via a service link 330-1. In some aspects, the satellite 320 may include base station capabilities (e.g., capabilities associated with the network node 110a and/or a gNB), and may be referred to as a non-terrestrial base station, a regenerative repeater, or an on-board processing repeater. Based at least in part on including the base station capabilities, the satellite 320 may demodulate an uplink radio frequency signal, and may modulate a baseband signal derived from the uplink radio signal to produce a downlink radio frequency transmission. To illustrate, the satellite 320 may transmit the downlink radio frequency signal on the service link 330-1. The satellite 320 may provide network access to the UE 120-1 over a coverage area (e.g., a cell coverage area). The first UE 120-1 may include a Global Navigation Satellite System (GNSS) capability or a Global Positioning System (GPS) capability.

Example 310 shows a transparent satellite deployment, which may also be referred to as a bent-pipe satellite deployment. In the example 310, a second UE 120-2 is served by a satellite 340 via the service link 330-2, where the satellite 340 may be referred to as a transparent satellite. To illustrate, the satellite 340 may act as a relay by receiving a signal from gateway 350 via a feeder link 360, and relaying the signal to the UE 120-2 via the service link 330-2. Alternatively or additionally, the satellite 340 may receive an uplink radio frequency transmission from the UE 120-2 via the service link 330-2, and relay the uplink radio frequency transmission to the gateway 350 via the feeder link 360 without demodulating the uplink radio frequency transmission. In some aspects, the satellite 340 may perform a frequency conversion on the uplink radio frequency transmission from a first frequency (e.g., associated with the service link 330-2) to a second frequency (e.g., associated with the feeder link 360), and may amplify and/or filter the uplink radio frequency transmission. The satellite 340 may provide network access to the UE 120-2 while the UE 120-2 operates in a coverage area associated with the satellite 340. The second UE 120-2 may include a GNSS capability or a GPS capability.

As shown by the example 310, the satellite 340 and the UE 120-2 may communicate with one another based at least in part on the service link 330-2. The service link 330-2 may include an uplink for transmitting an uplink communication (e.g., from the UE 120-2 to the gateway 350 by way of the satellite 340) and/or a downlink for transmitting a downlink communication (e.g., from the gateway 350 to the UE 120-2 by way of the satellite 340). In a similar manner, the satellite 340 and the gateway 350 may communicate with one another based at least in part on the feeder link 360, where the feeder link 360 may include an uplink for transmitting an uplink communication and/or a downlink for transmitting a downlink communication.

The feeder link 360, the service link 330-1, and/or the service link 330-2 may each experience Doppler shift due to the movement of the satellites 320 and 340, and/or movement of the UE 120-1 or the UE 120-2. A Doppler shift associated with satellite movement may be significantly larger than a Doppler shift associated with a terrestrial network, based at least in part on a speed at which a satellite moves. In some aspects, a transmitting device may pre-compensate for a satellite-based Doppler shift. To illustrate, the feeder link 360 between the gateway 350 and the satellite 340 may be a 1:1 link between a single transmitting device and a single receiving device. Based at least in part on the feeder link 360 being a 1:1 link, the gateway 350 and/or another network node may estimate a feeder link Doppler shift and pre-compensate (e.g., modify the transmitted signal) to mitigate the Doppler shift observed by the satellite 340. The satellite 340 may communicate with multiple UEs at varying locations based at least in part on a 1: N link, where N is an integer that may be greater than 1. To illustrate, the satellite 340 may broadcast information that is received and processed by N UEs at varying locations. The varying locations of the receiving UEs may result in each UE observing a different service link Doppler shift. Accordingly, the satellite 340 may refrain from applying pre-compensation for a service link Doppler shift based at least in part on the 1:N link and the variation in the observed service link Doppler shift between each UE. These sources of frequency error may cause a received downlink frequency at the UE 120 to drift from a target downlink frequency.

As indicated above, FIG. 3 is provided as an example. Other examples may differ from what is described with regard to FIG. 3.

Figure 4:
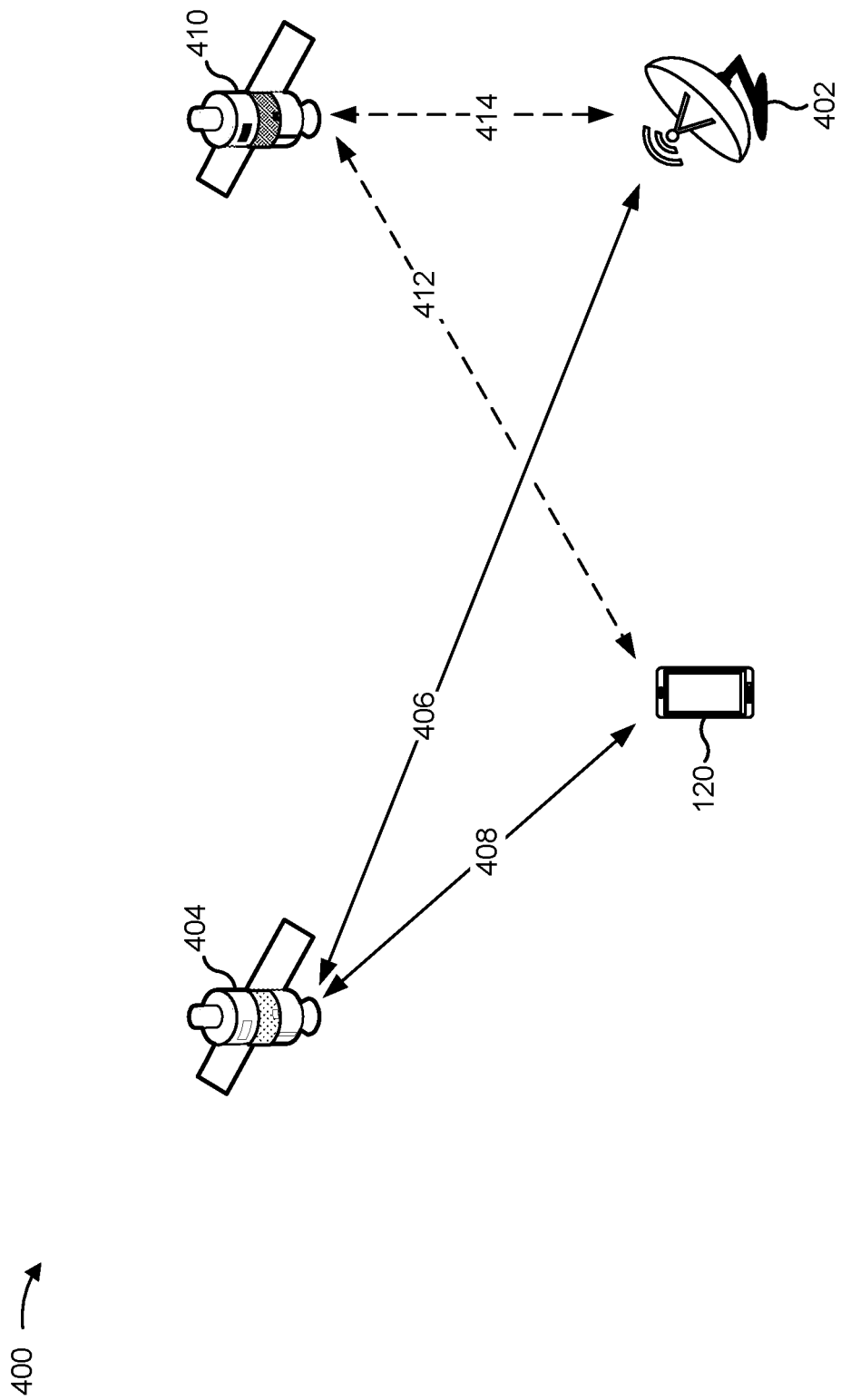
FIG. 4 is a diagram illustrating an example of mobility in an NTN, in accordance with the present disclosure.

FIG. 4 is a diagram illustrating an example 400 of mobility in an NTN, in accordance with the present disclosure.

An NTN may provide wireless access and/or service coverage in areas in which terrestrial cellular service is unavailable and/or difficult to reach (e.g., a mountain top, a body of water, and/or a canyon, among other examples). To illustrate, a UE 120 may receive a downlink communication from a gateway 402 by way of a first satellite 404. The first satellite 404 may wirelessly receive the downlink communication from the gateway 402 using a feeder link 406 and relay the downlink communication to the UE 120 using a service link 408. Alternatively, or additionally, and as described with regard to FIG. 3, the first satellite 404 may include base station functionality and communicate with the UE 120 as a regenerative satellite. The service link 408 and/or the feeder link 406 may alternatively or additionally be used for an uplink transmission.

To transmit an uplink communication, and to ensure uplink timing synchronization with the first satellite 404 and/or the gateway 402, the UE 120 may derive one or more uplink timing synchronization parameters, such as one or more timing advance (TA) parameters, based at least in part on ephemeris data (e.g., timing information, a current location and/or position of the satellite, a predicted location and/or predicted position of the satellite, satellite trajectory and/or orbit information, an epoch time, a satellite velocity vector, a satellite location vector, and/or a satellite identifier) associated with the first satellite 404. "Timing advance" may denote an advance or delay in time that is applied to a transmission (e.g., an uplink transmission) to mitigate a timing difference and/or align timing between one or multiple UE, the first satellite 404, the gateway 402, and/or a reference point determined by the NTN network. To illustrate, UE-detected timing information (e.g., for downlink and/or uplink), such as a UE-detected slot boundary and/or a UE-detected frame boundary, may differ from network node timing information (e.g., a network node slot boundary and/or a network node frame boundary). Timing differences may occur between the UE 120, the first satellite 404, and/or the gateway 402 based at least in part on propagation delays associated with location differences between the UE 120 and the first satellite 404 and/or location differences between the first satellite 404 and the gateway 402. Without using an accurate timing advance (e.g., accurate to within a threshold), uplink transmissions from different UEs (e.g., located at different distances from the first satellite 404 node 110) may collide and/or interfere with each other due to mistiming and/or asynchronization. For instance, without applying accurate timing advances, a first transmission by a first UE in a first considered uplink slot and a second transmission by a second UE in a second considered uplink slot may each arrive at a network node with a timing misalignment, resulting in mutual interference.

The UE 120 may derive one or more uplink TA parameters based at least in part on first ephemeris data and/or first common TA parameter(s) (e.g., non-UE-specific TA information and/or TA information that is common to all UEs) that is associated with the first satellite 404 and/or the gateway 402. Alternatively or additionally, the UE 120 may derive the one or more uplink TA parameters based at least in part on a location of the UE 120. In some aspects, the UE 120 may obtain the first ephemeris data and/or the common TA parameter(s) in a system information block (SIB), a unicast message (e.g., a transmission and/or message that is dedicated to the UE 120, such as a unicast radio resource control (RRC) message), and/or a multi-cast message (e.g., a transmission and/or message that is directed to a specific group of UEs that includes the UE 120, such as a multicast RRC message) transmitted by the first satellite 404. The first satellite 404 may indicate and/or specify a first validity duration that indicates a time span during which the first ephemeris data is valid and/or may be used by the UE 120 to derive an uplink TA parameter. Accordingly, the ephemeris data may become invalid and/or obsolete outside of the validity duration. That is, using the ephemeris data outside of the validity duration to derive an uplink TA parameter may result in timing errors in an uplink transmission and/or result in uplink collisions. To illustrate, the first ephemeris data may become invalid outside of the first validity duration based at least in part on the first satellite 404 moving location (e.g., to, or close to, a location predicted by and/or using the ephemeris data) and changing a propagation delay. Thus, the UE 120 may refrain from transmitting an uplink communication based at least in part on the ephemeris data being invalid.

The first satellite 404 may broadcast second ephemeris data and/or second common TA parameter(s) that are associated with a second satellite 410 (e.g., using an SIB) and/or the gateway 402. To illustrate, the UE 120 may use the second ephemeris data to perform a neighbor cell measurement that generates a measurement metric associated with a signal strength and/or signal quality (e.g., a power level) of a downlink signal transmitted by the second satellite 410. In some examples, the UE 120 may analyze the measurement metric to determine whether to perform a handover and/or to send a measurement report. The first satellite 404 may indicate and/or specify a second validity duration that indicates a second time span over which the second ephemeris data is valid and/or may be used by the UE 120 for measuring the downlink signal. In some aspects, the UE 120 may use any combination of the first ephemeris data, the first validity duration, the second ephemeris data, and/or the second validity duration to perform a neighbor cell measurement based at least in part on a downlink signal from the second satellite 410, such as by using the first ephemeris data based at least in part on the first validity duration to calculate a timing reference and the second ephemeris data based at least in part on the second validity duration to measure the downlink signal. Thus, the second validity duration differs from the first validity duration based at least in part on the second validity duration being associated with a downlink communication (e.g., from the second satellite 410) and the first validity duration being associated with an uplink communication (e.g., to the first satellite 404).

Synchronizing an uplink transmission may use more precise timing relative to measuring a downlink signal. For instance, the movement of a satellite may result in the ephemeris data becoming obsolete and/or invalid for deriving TA parameters for an uplink transmission based at least in part on a change in propagation delays. As described above, obsolete ephemeris data may introduce timing errors and/or result in an uplink transmission by the UE colliding with another transmission. However, the UE may measure a downlink transmission by a satellite using less precise timing relative to the uplink transmission. For instance, the UE may receive the downlink transmission without performing an uplink transmission. That is, the UE may receive the downlink transmission without introducing a potential of transmission collisions generated by the UE. As another example, the UE may measure a signal power level of a signal without performing time-sensitive operations (e.g., data recovery). Accordingly, the second validity duration associated with receiving a downlink communication from the second satellite 410 may have a longer time span relative to the first validity duration associated with transmitting an uplink communication to the first satellite 404.

As part of mobility support in an NTN, a UE may perform a handover from a first network node (e.g., the first satellite 404 or a first cell provided by the first satellite 404) to a second network node (e.g., the second satellite 410, a second cell provided the second satellite 410, and/or a second cell provided by the first satellite 404). For example, the UE 120 may disconnect from the first satellite 404 (e.g., by tearing down the service link 408), and connect to the gateway 402 based at least in part on a second service link 412 to the second satellite 410 and a second feeder link 414 between the second satellite 410 and the gateway 402. The second service link 412 and/or the second feeder link 414 may alternatively or be used for an uplink transmission.

In some aspects, the first satellite 404 may instruct the UE 120 to perform a handover to the second satellite 410. Alternatively, or additionally, the UE 120 may determine to perform a conditional handover to the second satellite 410 based at least in part on identifying that a handover condition has been met (e.g., a signal quality of the second satellite 410 satisfies a power threshold and/or a signal quality of the first satellite 404 fails to satisfy the power threshold and/or a second, different power threshold). For example, the UE 120 may perform a neighbor cell measurement on a downlink signal associated with the second satellite 410 based at least in part on ephemeris data associated with the second satellite 410 and a validity duration (e.g., the first validity duration) associated with the ephemeris data. As described above, the first satellite 404 may broadcast the ephemeris data and the validity duration associated with the second satellite 410. Alternatively, or additionally, the first satellite 404 may broadcast respective ephemeris data and a respective validity duration for multiple neighbor network nodes (e.g., multiple adjacent satellites), and the UE 120 may perform multiple neighbor cell measurements.

Performing a handover, whether a handover initiated by a source network node (e.g., the first satellite 404) or a conditional handover triggered by the UE 120, may include the UE 120 transmitting one or more uplink communications to a target network node (e.g., the second satellite 410), such as a random access channel (RACH) transmission. To mitigate transmission collisions associated with uplink transmissions directed to the target network node, the UE 120 may use ephemeris data and/or common TA parameters associated with the target network node to derive uplink synchronization timing information of the target network node as described above (e.g., timing advance information). Acquiring the ephemeris data and/or common TA parameter(s) of the target network node, however, may pose challenges.

As one example, the source network node (e.g., the first satellite 404) may transmit, and the UE 120 may receive, a handover message that includes ephemeris data and/or the common TA parameter(s) associated with the target network node (e.g., the second satellite 410). However, including the ephemeris data and/or the common TA parameter(s) in the handover message may result in the transmission of redundant information, increase signaling overhead, and/or consume additional air interface resources. To illustrate, the source network node may initially transmit the ephemeris data in an SIB, as described above, and the source network node may additionally include the ephemeris data in the handover message. The increased signaling overhead may result in reduced data throughput and/or increased data transfer latencies within the NTN. As another example, the UE 120 may synchronize to a downlink signal from the target network node and obtain the ephemeris data and/or common TA parameter(s) from the target network node (e.g., in an SIB transmitted by the target network node). However, the UE 120 synchronizing to the target network node and/or waiting for a transmission that includes the ephemeris data and/or common TA parameter(s) may introduce a delay that interrupts service to the UE 120, reduce data throughput, and/or increase data transfer latencies. As yet another example, the UE 120 may receive a conditional handover message (e.g., a conditional handover configuration message and/or a conditional handover command message) from the source network node (e.g., the first satellite 404). In some aspects, the conditional handover message may indicate any combination of ephemeris data associated with one or more target network nodes (e.g., respective ephemeris data for each target network node or general ephemeris data applicable to multiple network nodes), one or more common TA parameter(s) of the target network node(s) (e.g., respective common TA parameters for each network node or general common TA parameters applicable to multiple network nodes), and/or one or more condition(s) associated with triggering and/or executing a conditional handover (e.g., by the UE 120) to the one or multiple target network node(s). However, the UE 120 may incur a significant time delay between receiving the ephemeris data and the common TA parameter(s) before the fulfillment of the condition(s). Accordingly, the ephemeris data and/or the common TA parameter(s) indicated in the conditional handover message may become invalid at the time the condition(s) are fulfilled and/or when the conditional handover is triggered and/or executed by the UE 120. Thus, the UE 120 may synchronize to a downlink signal from the target network node to obtain valid ephemeris data and/or common TA parameter(s) from the target network node (e.g., in an SIB transmitted by the target network node) and introduce a time delay that interrupts service at the UE 120.

Some techniques and apparatuses described herein provide mobility management in an NTN. In some aspects, a UE may receive, from a first network node, a first indication of satellite assistance information that is associated with a second network node, a second indication of first timing information that is associated with the satellite assistance information, and a third indication of second timing information that is associated with the satellite assistance information. For example, the first timing information may specify a first validity duration associated with using the satellite assistance information for performing a neighbor cell measurement on a downlink signal from the second network node. The second timing information may specify a second validity duration associated with using the satellite assistance information for transmission of an uplink signal to the second network node. In some aspects, the UE may transmit an uplink signal to the second network node based at least in part on validating the satellite assistance information using the second timing information.

To illustrate, the UE may transmit an uplink signal to the second network node by deriving timing information from the satellite assistance information associated with the first indication and without receiving redundant information (e.g., redundant satellite assistance information) in a handover message. Alternatively, or additionally, the UE may derive the timing information without waiting for the satellite assistance information from the second network node. Accordingly, the UE may reuse the satellite assistance information transmitted by the first network node (e.g., broadcast in an SIB and/or transmitted in a unicast and/or multi-cast RRC message) for deriving uplink synchronization timing information, reduce signaling overhead and/or reduce air interface resource consumption. Reducing the signaling overhead may increase data throughput, decrease data transfer latencies, and/or mitigate service interruptions to the UE. Alternatively, or additionally, by using the second validity duration to validate the satellite assistance information, the UE may reduce timing errors in the derived uplink synchronization timing information (e.g., relative to using the first validity duration to validate the satellite assistance information) and mitigate timing errors, interference, and/or transmission collisions.

As indicated above, FIG. 4 is provided as an example. Other examples may differ from what is described with regard to FIG. 4.

Figure 5:
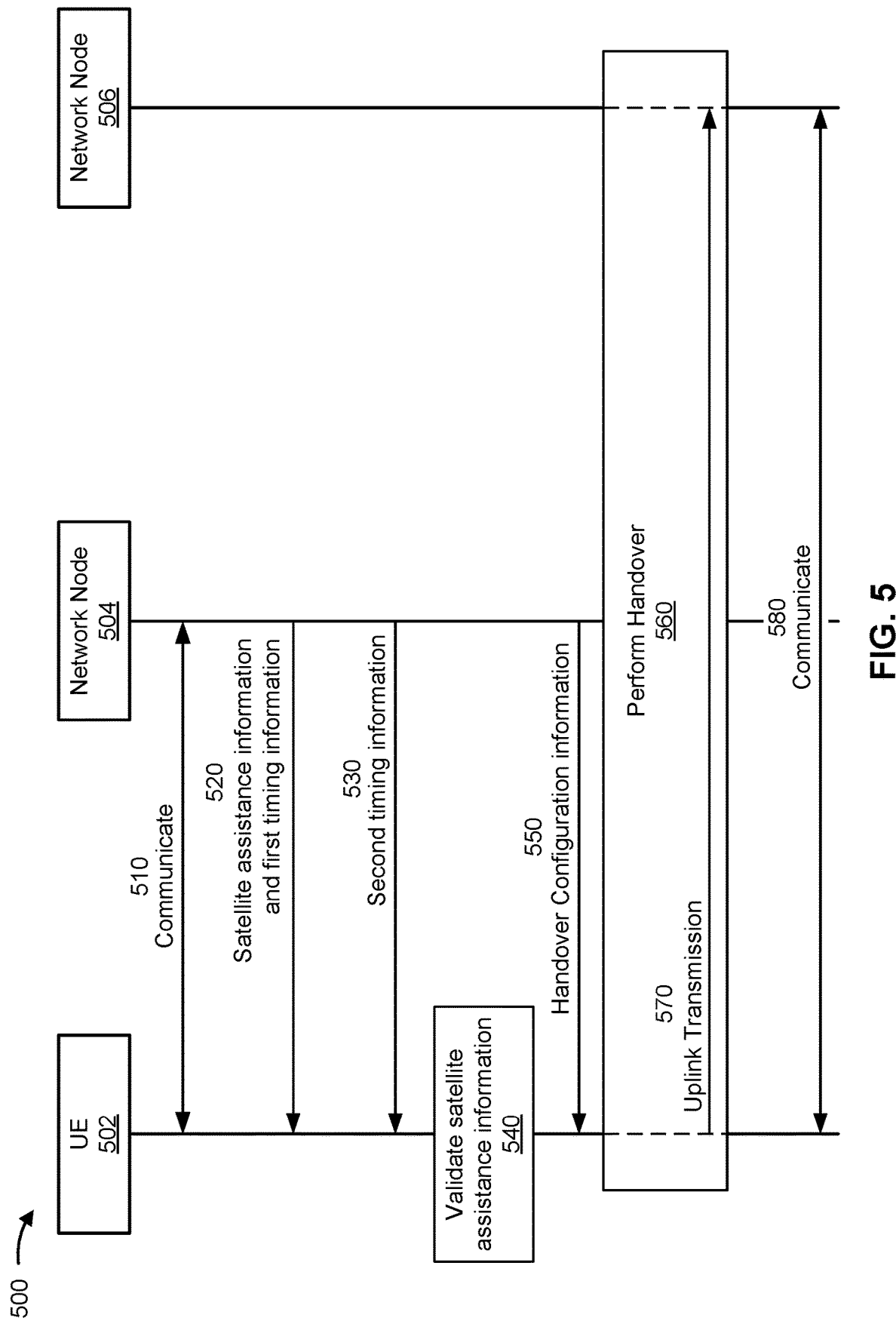
FIG. 5 is a diagram illustrating an example of a wireless communication process between a UE, a first network node, and a second network node, in accordance with the present disclosure.

FIG. 5 is a diagram illustrating an example 500 of a wireless communication process between a UE 502 (e.g., the UE 120), a first network node 504 (e.g., a first network node 110 and/or the first satellite 404), and a second network node 506 (e.g., another network node 110 and/or the second satellite 410), in accordance with the present disclosure. In some aspects, the first network node 504 and the second network node 506 may be co-located, while in other aspects, the first network node 504 and the second network node 506 may be positioned at different locations and/or may be included in different devices.

As shown by reference number 510, a UE 502 may communicate with a first network node 504. In some aspects, the UE 502 and the first network node 504 may communicate with one another based at least in part on an NTN. For example, and as described with regard to FIGS. 3 and 4, a gateway and/or ground station may transmit a downlink signal to a satellite via a feeder link, and the satellite may relay the downlink transmission to the UE 502 via a service link. Alternatively, or additionally, the UE 502 may transmit an uplink signal to the satellite via the service link, and the satellite may relay the uplink signal to the gateway via the feeder link. In some aspects, the UE 502 may communicate uplink and/or downlink signals with the first network node 504 based at least in part on the first network node 504 being deployed as a regenerative satellite.

As shown by reference number 520, the first network node 504 may transmit, and the UE 502 may receive, a first indication of satellite assistance information associated with the second network node 506 and/or a second indication of first timing information associated with the satellite assistance information. As one example, the satellite assistance information may include ephemeris data associated with the second network node 506. Alternatively, or additionally, the satellite assistance information may include one or more common TA parameters associated with the second network node and/or a gateway, such as a common TA, a drift rate of the common TA and/or a drift rate variation of the common TA. The first timing information may include a first epoch time and/or a first validity duration that is based at least in part on the first epoch time. The first validity duration may specify a time span over which the satellite assistance information (e.g., the ephemeris data) is valid and/or may be used by the UE 120 for measuring a downlink signal from the second network node 506 (e.g., for performing a neighbor cell measurement).

The UE 120 may perform a neighbor cell measurement based at least in part on multiple sets of ephemeris data and/or multiple validation durations. For example, the UE 120 may use first ephemeris data associated with the first network node 504 (e.g., a serving network node) to derive timing information and/or a timing reference. That is, the UE 120 may derive a timing reference based at least in part on the first ephemeris data, a validity duration associated with the first ephemeris data, and a downlink signal from the first network node 504. Alternatively, or additionally, the UE 120 perform the neighbor cell measurement based at least in part on the timing reference, second ephemeris data associated with the second network node 506, and/or a downlink signal from the second network node 506.

In some aspects, the first network node 504 may transmit respective satellite assistance information and/or respective first timing information associated with multiple network nodes (e.g., neighbor network nodes that are associated with adjacent cells and/or within a distance threshold to the first network node). For instance, the first network node 504 may transmit, as the first indication of satellite assistance information and the second indication of first timing information, first neighbor satellite assistance information and/or first neighbor timing information associated with a first neighbor network node, second neighbor satellite assistance information and/or second neighbor timing information associated with a second neighbor network node, and/or third neighbor satellite assistance information and/or third neighbor timing information associated with a third neighbor network node. In some aspects, the first network node 504 may indicate a respective satellite assistance information identifier (ID) for each respective satellite assistance information transmitted by the first network node 504, either explicitly (e.g., by transmitting a respective integer for each satellite assistance information) or implicitly (e.g., a position in a list and/or a cell ID may indicate a satellite assistance information ID). In some examples, a neighbor network node and/or a neighbor cell may reside at a different device (e.g., a different satellite) relative to a serving network node. In other examples, the neighbor network node and/or the neighbor cell may be co-located with the serving network node (e.g., at a same device and/or a same satellite), but have a different a different (physical) cell ID than the serving satellite. Accordingly, such as in examples in which the neighbor network node and/or neighbor cell is co-located with the serving network node, satellite assistance information associated with the serving network node may be used as neighbor satellite assistance information.

The first network node 504 may transmit the first indication of the satellite assistance information by broadcasting the first indication. To illustrate, the first network node 504 may broadcast the first indication of the satellite assistance information in an SIB. Alternatively, or additionally, the first network node 504 may transmit the second indication of the first timing information in the SIB. The SIB may be based at least in part on an SIB19 format (e.g., as specified in 3GPP Technical Specification 38.331) that is associated with indicating satellite assistance information for one or more neighboring network nodes and/or one or more neighboring cells. In some aspects, the SIB19 format may include one or more information elements (IEs) that include one or more parameters, enumerations, and/or fields for specifying the satellite assistance information and/or the first timing information. Alternatively or additionally, the first network node 504 may transmit the first indication of the satellite assistance information and/or the first timing information in a unicast message and/or a multi-cast message to the UE 120 (e.g., as a unicast RRC message and/or a multi-cast RRC message).

As shown by reference number 530, the first network node 504 may transmit, and the UE 502 may receive, a third indication of second timing information associated with the satellite assistance information. As one example, the first network node 504 may transmit the third indication in a separate downlink transmission than the first indication and/or second indication. To illustrate, the first network node 504 may transmit the first indication of the satellite assistance information and the second indication of the first timing information in a first downlink transmission (e.g., the broadcast SIB), and transmit the third indication in a second, separate downlink transmission, such as any combination of an RRC message, a medium access control (MAC) control element (CE), downlink control information (DCI), and/or a handover message as described with regard to reference number 550. Alternatively, or additionally, the first network node 504 may broadcast the third indication of the second timing information in a separate broadcast message (e.g., a separate SIB) than the first indication and the second indication.

In other examples, the first network node 504 may transmit the third indication in a same, single downlink transmission as the first indication of the satellite assistance information and/or the second indication of the first timing information. For example, the first network node 504 may include the first indication, the second indication, and the third indication in a single SIB (e.g., with an SIB19 format). In this case, the single SIB may include and/or indicate one or more IEs that specify any combination of the satellite assistance information, the first timing information, and/or the second timing information (e.g., for a single neighbor network node or for multiple neighbor network nodes). In some examples, the first network node 504 may include the first indication, the second indication, and the third indication in a single unicast message and/or a single multi-cast message (e.g., a single unicast RRC message and/or a single multi-cast RRC message).

The second timing information may include and/or specify a second validity duration that is associated with validating the satellite assistance information for transmission of an uplink signal (e.g., an uplink signal directed to a single neighbor network node or to multiple neighbor network nodes). In some aspects, the first network node 504 may indicate, with the second timing information, a satellite assistance information ID to enable the UE 502 to identify which satellite assistance information is associated with the second timing information. That is, the UE 502 may identify the satellite assistance information that is associated with the second timing information based at least in part on a same satellite assistance information ID being assigned to both. In some aspects, the second validity duration may be based at least in part on the first epoch time indicated in the first timing information. Alternatively, or additionally, the second timing information may include a second epoch time, and the second validity duration may be based at least in part on the second epoch time. In some examples, the first network node 504 may indicate the second timing information together with the first timing information. As one example, the first network node 504 may transmit the first timing information and the second timing together in a single message, such as a same SIB. Alternatively or additionally, the first timing information may be included in a first IE indicated in the SIB, and the second timing information may be included in a second IE indicated in the SIB, where the second ID is adjacent to and/or immediately follows the first IE. In some aspects, the UE 502 may identify the association between satellite assistance information, the first timing information, and/or the second timing information based at least in part on relative locations of the satellite assistance information, the first timing information, and/or the second timing information to one another.

The second timing information may indicate the second validity duration in a variety of ways. As one example, the second timing information may indicate an absolute time span and/or absolute duration. As another example, the second timing information may indicate a fraction, and the second validity duration may be based at least in part on applying the fraction to the first validity duration indicated by the first timing information. That is, the second validity duration may be a fraction of the first validity duration, and the second timing information specifies the fraction. Accordingly, the UE 120 may calculate the second validity duration based at least in part on applying the fraction to the first validity duration.

The second timing information may indicate (respective) second timing information for multiple neighbor network nodes. For instance, the second timing information may indicate a first uplink validity duration (e.g., for validating use of satellite assistance information for transmission of an uplink signal) for validating first (neighbor) satellite assistance information associated with a first neighbor network node and a second uplink validity duration for validating second (neighbor) satellite assistance information associated with a second neighbor network node. Alternatively, or additionally, the second timing information may specify a single validity duration that is associated with uplink transmissions, and the single validity duration may be associated with multiple instances of satellite assistance information (e.g., the first neighbor satellite assistance information and the second neighbor satellite assistance information).

In some aspects, the third indication of the second timing information may specify to use, as a second validity duration that is associated with an uplink transmission, a first validity duration indicated by the first timing information. For example, the first network node 504 may select, for the first validity duration, a time span that may be used to validate the satellite assistance information for both performing a neighbor cell measurement and transmitting an uplink signal. That is, the first network node 504 may select a time span that enables the UE 120 to synchronize an uplink transmission using the satellite assistance information and to perform a neighbor cell measurement using a downlink signal. The third indication may specify to use the first validity duration as the second validity duration based at least in part on including an explicit indication (e.g., a Boolean field or a bit value) in a downlink transmission, such as a downlink transmission associated with a handover message (e.g., a handover command) as described with regard to reference number 550.

Alternatively, or additionally, the third indication may specify to use the first validity duration as the second validity duration based at least in part on an implicit indication in the downlink transmission, such as by omitting explicit second timing information in the handover message.

In some aspects, the third indication of the second timing information for validating use of the satellite assistance information for transmitting an uplink signal to the second network node 506 may specify to use, as a second validity duration that is associated with an uplink transmission to the second network node 506, a validity duration that is associated with transmitting uplink signal to the first network node 504. To illustrate, the first network node 504 and the second network node 506 may be co-located (e.g., on a same satellite, but provide different cells). In such an example, timing information and/or the ephemeris data associated with the first network node 504 may be associated and/or applicable to the second network node 506. Accordingly, the third indication of the second timing information may specify to use, as the second validity duration associated with using the satellite assistance information to derive timing information for an uplink transmission to the second network node 506, a validity duration associated with an uplink transmission to the first network node 504. The third indication may be an explicit indication or implicit indication to use the validity duration associated with an uplink transmission to the first network node 504 as the second validity duration associated with using the ephemeris data for an uplink transmission to the second network node 506 (e.g., based at least in part on the first network node 504 and the second network node 506 being co-located and/or relaying through a same satellite).

As shown by reference number 540, the UE 502 may validate the satellite assistance information. In some aspects, the UE 502 may validate the satellite assistance information for use in performing a neighbor cell measurement based at least in part on the first timing information. Alternatively, or additionally, the UE 502 may validate use of the satellite assistance information for transmitting an uplink signal to the second network node 506 based at least in part on the second timing information. For instance, the UE 502 may first validate the satellite assistance information to perform the neighbor cell measurement using a downlink signal from the second network node 506, and then validate the satellite assistance information for transmitting an uplink signal to the second network node 506. In some aspects, the UE 502 may validate the satellite assistance information based at least in part on the first timing information and/or the second timing information. To illustrate, the first timing information may include a first epoch time and a first validity duration (e.g., associated with measuring a downlink signal) and the second timing information may include a second validity duration that is based at least in part on the first epoch time. Accordingly, the UE 502 may validate using the satellite assistance information for transmitting an uplink signal (e.g., using the satellite assistance information for deriving uplink timing information) based at least in part on the first epoch time and the second validity duration. In other examples, the second timing information may include a second epoch time, and the UE may validate using the satellite assistance information for transmitting an uplink signal based at least in part on the first epoch time and the second validity duration.

In some aspects, the UE 502 may trigger a conditional handover based at least in part on the neighbor cell measurement as described above and/or based at least in part on determining that the satellite assistance information is valid to use for transmitting an uplink signal to the second network node 506. In some aspects, the UE 502 may indicate to the first network node 504 if the satellite assistance information is valid and/or will be valid in a near future for transmitting the uplink signal, such as by indicating a valid time span remaining. Alternatively or additionally, the UE 502 may indicate that the satellite assistance information is invalid or will be invalid in a near future for transmitting the uplink signal. For example, the UE 502 may determine that a validity duration has expired and/or is within a validity threshold of expiring. Based at least in part on the UE 502 indicating that the satellite assistance information is invalid (or will be invalid), the first network node 504 may transmit an updated satellite assistance information to the UE 502.

The UE 502 may validate a single instance of satellite assistance information or multiple instances of satellite assistance information. As one example, the UE 502 may use a respective validity duration to validate each instance of satellite assistance information. Alternatively, or additionally, the UE 502 may use a single validity duration for multiple instances of the satellite assistance information (e.g., neighbor satellite assistance information). To illustrate, the UE 502 may validate first satellite assistance information for transmitting a first uplink signal to a first neighbor network node and/or validate second satellite assistance information for transmitting a second uplink signal to a second neighbor network node, based at least in part on the single validity duration. The UE 502 may identify which satellite assistance information is associated with the second timing information based at least in part on a satellite assistance information ID. For example, prior to validating the satellite assistance information, the UE 502 may compare a first satellite assistance information ID associated with the second timing information and a second satellite assistance information ID associated with the satellite assistance information to verify that the second timing information and the satellite assistance information are related.

In some aspects, the UE 502 may fail to validate satellite assistance information for transmitting an uplink signal to the second network node 506 (e.g., as part of a handover and/or a conditional handover). For example, the UE 502 may determine that a validity duration for using the satellite assistance information to derive uplink timing parameters has expired. Based at least in part on failing to validate the satellite assistance information, the UE 502 may iteratively monitor an SIB transmission from the first network node 504 and/or the second network node 506 to obtain updated satellite assistance information and/or an updated uplink validity duration associated with the second network node 506. Alternatively, or additionally, the UE 502 may iteratively attempt to validate the updated satellite assistance information based at least in part on the updated validity duration. In other example, the UE 502 may obtain the updated satellite assistance information and/or the updated validity duration in a unicast message (e.g., an RRC message and/or a handover message).

As shown by reference number 550, the first network node 504 may transmit, and the UE 502 may receive, a handover message, such as a handover command and/or a handover configuration message. The first network node 504 may omit satellite assistance information from the handover message based at least in part on the UE 502 triggering a conditional handover and/or the UE 502 indicating that the satellite assistance information received by the UE 502 in an SIB is valid for transmitting an uplink signal to the second network node 506.

As shown by reference number 560, the UE 502, the first network node 504, and/or the second network node 506 may perform a handover, which may include a conditional handover triggered by the UE 502. As part of performing the handover, the UE 502 may disconnect from the first network node 504 and connect to the second network node 506. As shown by reference number 570, the UE 502 may transmit an uplink signal to the second network node 506 as part of performing the handover. That is, the UE 502 may transmit the uplink signal based at least in part on receiving the handover command and/or based at least in part on triggering a conditional handover. However, in other examples, the UE 502 may transmit the uplink signal for other types of procedures. For instance, based at least in part on experience a handover failure, the UE 502 may transmit the uplink signal associated an RRC procedure, such as for RRC reestablishment procedure.

The UE 502 may transmit the uplink signal based at least in part on the satellite assistance information, the first timing information, and/or the second timing information as shown with regard to reference number 520 and reference number 530. As described above, the UE 502 may determine and/or derive uplink synchronization timing information associated with the second network node 506 using the satellite assistance information, the first timing information (e.g., a first epoch time indicated in the first timing information) and the second timing information. Accordingly, the UE 502 may transmit the uplink signal based at least in part on the uplink synchronization timing information. Alternatively, or additionally, the UE 502 may transit the uplink signal based at least in part on validating the satellite assistance information for transmission of an uplink signal as described with regard to reference number 540.

As shown by reference number 580, the UE 502 and the second network node 506 may communicate with one another. For example, and as described with regard to FIGS. 3 and 4, a gateway and/or ground station may transmit a downlink signal to the second network node 506 via a feeder link, and the second network node 506 may relay the downlink transmission to the UE 502 via a service link. Alternatively, or additionally, the UE 502 may transmit an uplink signal to the second network node 506 via the service link, and the second network node 506 may relay the uplink signal to the gateway via the feeder link. In some aspects, the UE 502 may communicate uplink and/or downlink signals with the second network node 506 based at least in part on the second network node 506 being deployed as a regenerative satellite.

By validating satellite assistance information based at least in part on a first validity duration, a UE may perform a neighbor cell measurement that indicates a signal quality associated with a second and/or non-serving network node. By validating satellite assistance information based at least in part on a second validity duration, the UE may transmit an uplink signal to the second network node (e.g., by deriving timing information from the satellite assistance information) without receiving redundant information in an additional message for a current serving network node and/or without waiting for the satellite assistance information from the second, non-serving network node. Accordingly, the UE may reuse the satellite assistance information transmitted by the serving network node, reduce signaling overhead and/or reduce a number of air interface resources used for signaling overhead. Reducing the signaling overhead may increase data throughput, decrease data transfer latencies, and/or mitigate service interruptions to the UE.

As indicated above, FIG. 5 is provided as an example. Other examples may differ from what is described with regard to FIG. 5.

Figure 6:
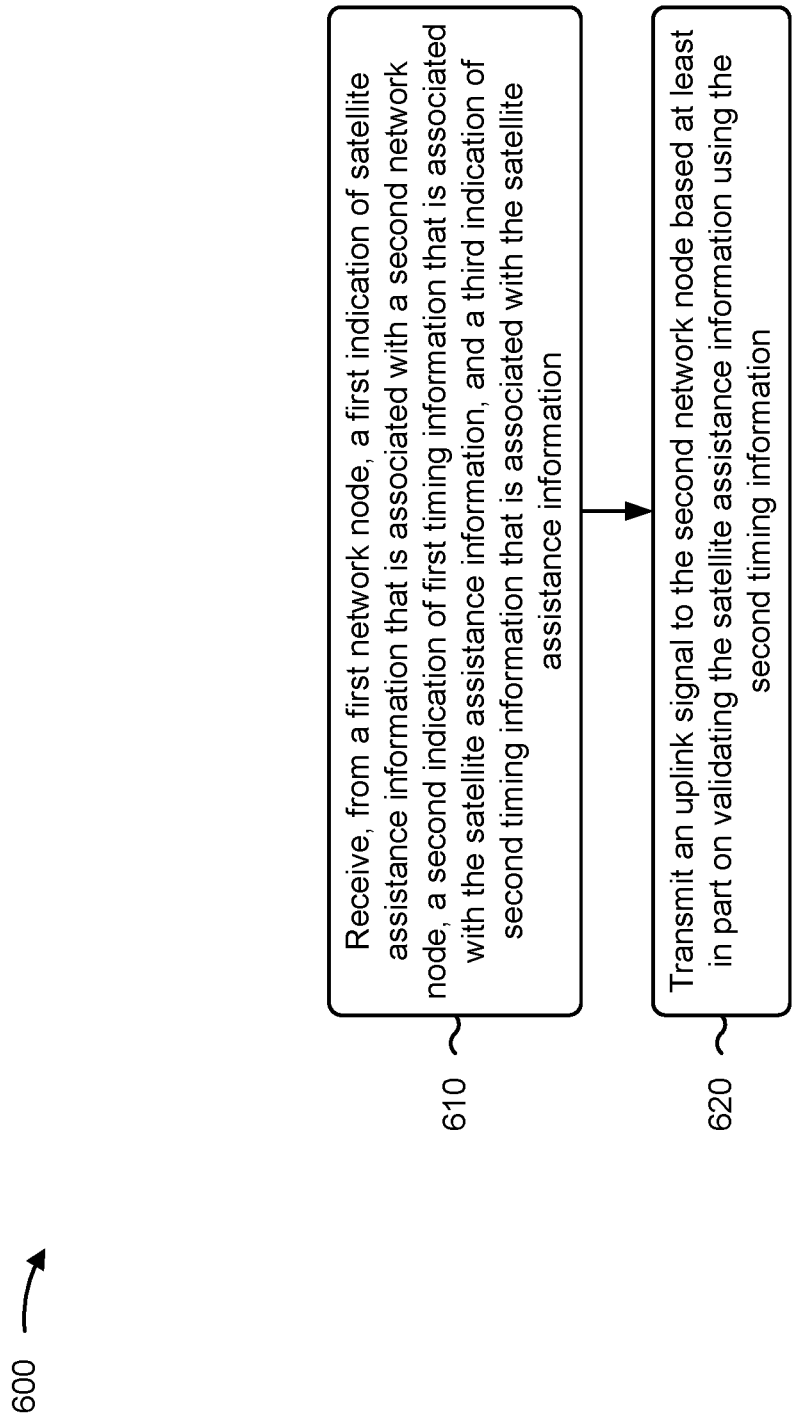
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with mobility management in an NTN.

As shown in FIG. 6, in some aspects, process 600 may include receiving, from a first network node, a first indication of satellite assistance information that is associated with a second network node, a second indication of first timing information that is associated with the satellite assistance information, and a third indication of second timing information that is associated with the satellite assistance information (block 610). For example, the UE (e.g., using communication manager 140 and/or reception component 802, depicted in FIG. 8) may receive, from a first network node, a first indication of satellite assistance information that is associated with a second network node, a second indication of first timing information that is associated with the satellite assistance information, and a third indication of second timing information that is associated with the satellite assistance information, as described above.

As further shown in FIG. 6, in some aspects, process 600 may include transmitting an uplink signal to the second network node based at least in part on validating the satellite assistance information using the second timing information (block 620). For example, the UE (e.g., using communication manager 140 and/or transmission component 804, depicted in FIG. 8) may transmit an uplink signal to the second network node based at least in part on validating the satellite assistance information using the second timing information, as described above.

Process 600 may include additional aspects, such as any single aspect or any combination of aspects described below and/or in connection with one or more other processes described elsewhere herein.

In a first aspect, the satellite assistance information includes at least one of ephemeris data associated with the second network node, or one or more common timing advance parameters associated with the second network node.

In a second aspect, receiving the first indication of the satellite assistance information includes receiving the first indication in an SIB, and receiving the second indication of the first timing information includes receiving the second indication of the first timing information in the SIB.

In a third aspect, the first timing information includes a first epoch time, and a first validity duration that is based at least in part on the first epoch time.

In a fourth aspect, the first validity duration is associated with validating use of the satellite assistance information for performing a neighbor cell measurement that is associated with the second network node.

In a fifth aspect, the second timing information includes a second validity duration that is associated with validating the satellite assistance information for transmission of the uplink signal, and the first validity duration and the second validity duration are based at least in part on the first epoch time.

In a sixth aspect, the SIB includes an SIB 19 format.

In a seventh aspect, the second timing information includes a second validity duration that is associated with validating the satellite assistance information for transmission of the uplink signal.

In an eighth aspect, the second timing information includes a second epoch time, and the second validity duration is based at least in part on the second epoch time.

In a ninth aspect, the first timing information includes a first validity duration for validating use of the satellite assistance information for performing a neighbor cell measurement associated with the second network node, and the third indication specifies, as the second validity duration, a fraction of the first validity duration.

In a tenth aspect, the second validity duration is an absolute duration.

In an eleventh aspect, process 600 includes deriving an uplink timing advance parameter based at least in part on the satellite assistance information, and transmitting the uplink signal includes transmitting the uplink signal based at least in part on using the uplink timing advance parameter.

In a twelfth aspect, transmitting the uplink signal includes transmitting the uplink signal as part of a handover from the first network node to the second network node.

In a thirteenth aspect, the handover is a conditional handover.

In a fourteenth aspect, process 600 includes receiving, from the first network node, a handover command, and transmitting the uplink signal is based at least in part on receiving the handover command.

In a fifteenth aspect, process 600 includes determining uplink synchronization timing with the second network node based at least in part on the first indication of the satellite assistance information and the third indication of the second timing information received from the first network node, and transmitting the uplink signal is based at least in part on the uplink synchronization timing.

In a sixteenth aspect, process 600 includes validating use of the satellite assistance information for transmitting the uplink signal based at least in part on the second timing information, and transmitting the uplink signal is based at least in part on validating the satellite assistance information.

In a seventeenth aspect, receiving the first indication of the satellite assistance information, the second indication of the first timing information, and the third indication of the second timing information includes receiving the first indication of the satellite assistance information, the second indication of the first timing information, and the third indication of the second timing information in at least one broadcast message.

In an eighteenth aspect, receiving the first indication of the satellite assistance information, the second indication of the first timing information, and the third indication of the second timing information includes receiving the first indication of the satellite assistance information, the second indication of the first timing information, and the third indication of the second timing information in a single downlink transmission.

In a nineteenth aspect, receiving the first indication of the satellite assistance information, the second indication of the first timing information, and the third indication of the second timing information includes receiving the first indication of the satellite assistance information, the second indication of the first timing information, and the third indication of the second timing information in one or more information elements.

In a twentieth aspect, receiving the first indication of the satellite assistance information, the second indication of the first timing information, and the third indication of the second timing information includes receiving the first indication and the second indication together in a system information block, and receiving the third indication in a downlink transmission that is separate from the system information block.

In a twenty-first aspect, the downlink transmission that is separate from the system information block includes at least one of an RRC message, a MAC CE, downlinking control information, or a handover message.

In a twenty-second aspect, process 600 includes receiving, based at least in part on the first indication of the satellite assistance information, a satellite assistance information identifier that is associated with the satellite assistance information, and receiving, with the third indication of the second timing information, the satellite assistance information identifier.

In a twenty-third aspect, validating the satellite assistance information using the second timing information is based at least in part on the satellite assistance information identifier.

In a twenty-fourth aspect, receiving the first indication and the third indication includes receiving the first indication based at least in part on a first downlink transmission, and receiving the third indication based at least in part on a second downlink transmission.

In a twenty-fifth aspect, the second network node is a first neighbor network node, and the satellite assistance information includes first satellite assistance information associated with the first neighbor network node and at least second satellite assistance information associated with a second neighbor network node.

In a twenty-sixth aspect, the uplink signal is a first uplink signal, the second timing information includes a single validity duration, and the single validity duration is associated with validating the first satellite assistance information for transmitting the first uplink signal to the first neighbor network node. Alternatively or additionally, the single validity duration is associated with validating the at least second satellite assistance information for transmitting a second uplink signal to the second neighbor network node.

In a twenty-seventh aspect, the uplink signal is a first uplink signal, and the second timing information includes a second validity duration that is associated with validating use of the first satellite assistance information for transmitting the first uplink signal to the first neighbor network node Alternatively or additionally, the second timing information includes at least a third validity duration that is associated with validating use of the second satellite assistance information for transmitting a second uplink signal to the second neighbor network node.

In a twenty-eighth aspect, the second indication of the first timing information includes a first validity duration that is associated with validating the satellite assistance information for a neighbor cell measurement, and the third indication indicates to use, as a second validity duration that is associated with validating the satellite assistance information for use in transmitting the uplink signal, the first validity duration.

In a twenty-ninth aspect, the third indication is an explicit indication included in a downlink transmission.

In a thirtieth aspect, the downlink transmission includes a handover message.

In a thirty-first aspect, the third indication is an implicit indication that is based at least in part on a downlink transmission omitting the second timing information.

In a thirty-second aspect, the first network node and the second network node are co-located.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
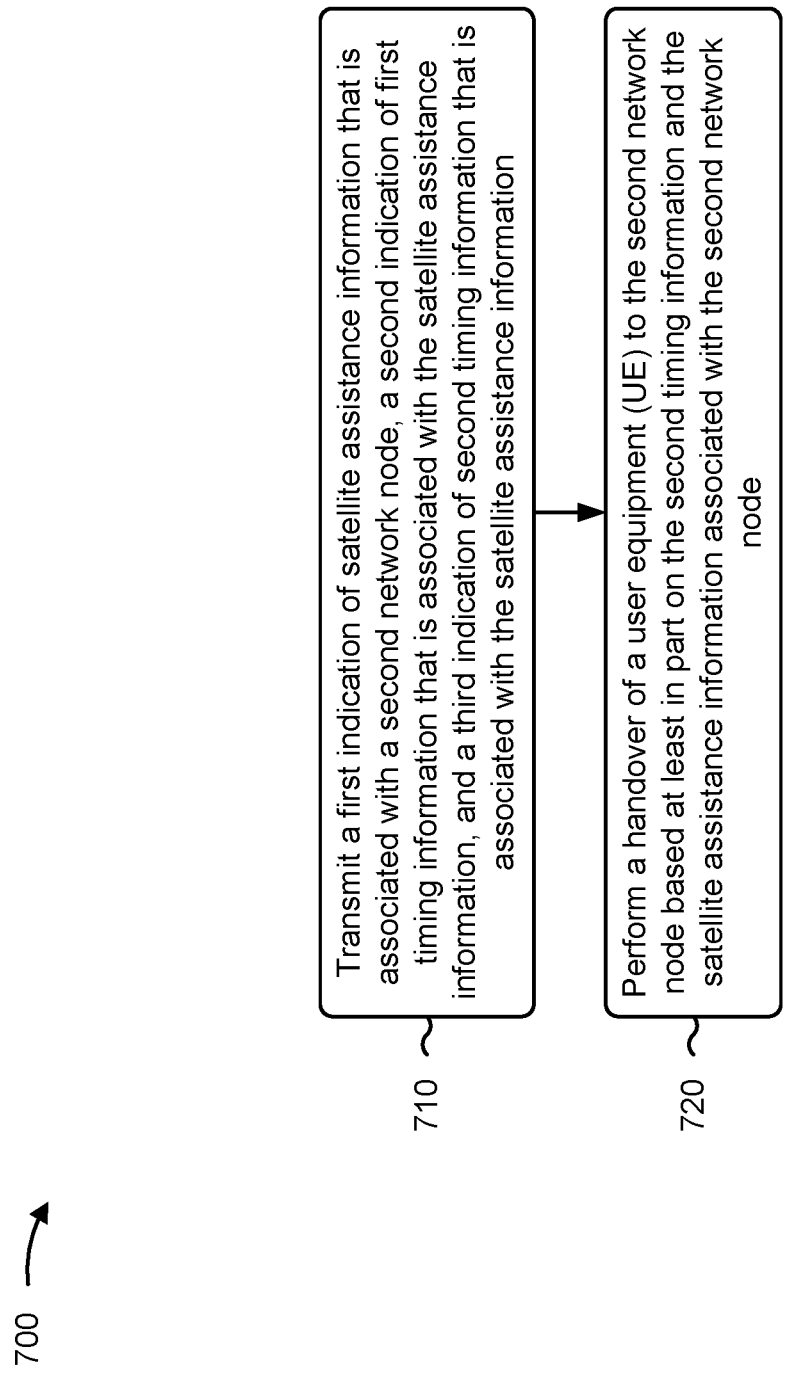
FIG. 7 is a diagram illustrating an example process performed, for example, by a network node, in accordance with the present disclosure.

FIG. 7 is a diagram illustrating an example process 700 performed, for example, by a network node, in accordance with the present disclosure. Example process 700 is an example where the network node (e.g., network node 110, network node 504) performs operations associated with mobility management in an NTN.

As shown in FIG. 7, in some aspects, process 700 may include transmitting a first indication of satellite assistance information that is associated with a second network node, a second indication of first timing information that is associated with the satellite assistance information, and a third indication of second timing information that is associated with the satellite assistance information (block 710). For example, the network node (e.g., using communication manager 150 and/or transmission component 904, depicted in FIG. 9) may transmit a first indication of satellite assistance information that is associated with a second network node, a second indication of first timing information that is associated with the satellite assistance information, and a third indication of second timing information that is associated with the satellite assistance information, as described above.

As further shown in FIG. 7, in some aspects, process 700 may include performing a handover of a UE to the second network node based at least in part on the second timing information and the satellite assistance information associated with the second network node (block 720). For example, the network node (e.g., using communication manager 150 depicted in FIG. 9) may perform a handover of a UE to the second network node based at least in part on the second timing information and the satellite assistance information associated with the second network node, as described above.

Process 700 may include additional aspects, such as any single aspect or any combination of aspects described below and/or in connection with one or more other processes described elsewhere herein.

In a first aspect, the satellite assistance information includes at least one of ephemeris data associated with the second network node, or one or more common timing advance parameters associated with the second network node.

In a second aspect, transmitting the first indication of the satellite assistance information that is associated with the second network node and the second indication of the first timing information that is associated with the satellite assistance information includes transmitting the first indication and the second indication in an SIB.

In a third aspect, the first timing information includes a first epoch time, and a first validity duration that is based at least in part on the first epoch time.

In a fourth aspect, the first validity duration is associated with validating use of the satellite assistance information for performing a neighbor cell measurement that is associated with the second network node.

In a fifth aspect, the SIB includes an SIB 19 format.

In a sixth aspect, the second timing information includes a second validity duration that is associated with validating the satellite assistance information for transmission of an uplink signal to the second network node.

In a seventh aspect, the second timing information includes a second epoch time, and the second validity duration is based at least in part on the second epoch time.

In an eighth aspect, the first timing information includes a first validity duration for validating use of the satellite assistance information for performing a neighbor cell measurement associated with the second network node, and the third indication specifies, as the second validity duration, a fraction of the first validity duration.

In a ninth aspect, the second validity duration is an absolute duration.

In a tenth aspect, the handover is based at least in part on a conditional handover.

In an eleventh aspect, process 700 includes transmitting a handover command to the UE.

In a twelfth aspect, transmitting the first indication of the satellite assistance information, the second indication of the first timing information, and the third indication of the second timing information includes transmitting the first indication of the satellite assistance information, the second indication of the first timing information, and the third indication of the second timing information in at least one broadcast message.

In a thirteenth aspect, transmitting the first indication of the satellite assistance information, the second indication of the first timing information, and the third indication of the second timing information includes transmitting the first indication of the satellite assistance information, the second indication of the first timing information, and the third indication of the second timing information in a single downlink transmission.

In a fourteenth aspect, transmitting the first indication of the satellite assistance information, the second indication of the first timing information, and the third indication of the second timing information includes transmitting the first indication of the satellite assistance information, the second indication of the first timing information, and the third indication of the second timing information in one or more information elements.

In a fifteenth aspect, transmitting the first indication of the satellite assistance information, the second indication of the first timing information, and the third indication of the second timing information includes transmitting the first indication and the second indication together in a system information block, and transmitting the third indication in a downlink transmission that is separate from the system information block.

In a sixteenth aspect, the downlink transmission that is separate from the system information block includes at least one of an RRC message, a MAC CE, downlinking control information, or a handover message.

In a seventeenth aspect, process 700 includes transmitting, based at least in part on the first indication of the satellite assistance information, a satellite assistance information identifier that is associated with the satellite assistance information, and transmitting, with the third indication of the second timing information, the satellite assistance information identifier.

In an eighteenth aspect, transmitting the first indication and the third indication includes transmitting the first indication based at least in part on a first downlink transmission, and transmitting the third indication based at least in part on a second downlink transmission.

In a nineteenth aspect, the second network node is a first neighbor network node, and the satellite assistance information includes first satellite assistance information associated with the first neighbor network node and at least second satellite assistance information associated with a second neighbor network node.

In a twentieth aspect, the second timing information includes a single validity duration, and the single validity duration is associated with validating the first satellite assistance information for transmitting a first uplink signal to the first neighbor network node. Alternatively or additionally, the single validity duration is associated with validating at least the second satellite assistance information for transmitting a second uplink signal to the second neighbor network node.

In a twenty-first aspect, the second timing information includes a second validity duration that is associated with validating use of the first satellite assistance information for transmitting a first uplink signal to the first neighbor network node, and at least a third validity duration that is associated with validating use of the second satellite assistance information for transmitting a second uplink signal to the second neighbor network node.

In a twenty-second aspect, the second indication of the first timing information includes a first validity duration that is associated with validating the satellite assistance information for a neighbor cell measurement, and the third indication indicates to use, as a second validity duration that is associated with validating the satellite assistance information for use in transmitting an uplink signal to the second network node, the first validity duration.

In a twenty-third aspect, the third indication is an explicit indication included in a downlink transmission.

In a twenty-fourth aspect, the downlink transmission includes a handover message.

In a twenty-fifth aspect, the third indication is an implicit indication that is based at least in part on a downlink transmission omitting the second timing information.

In a twenty-sixth aspect, the network node and the second network node are co-located.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
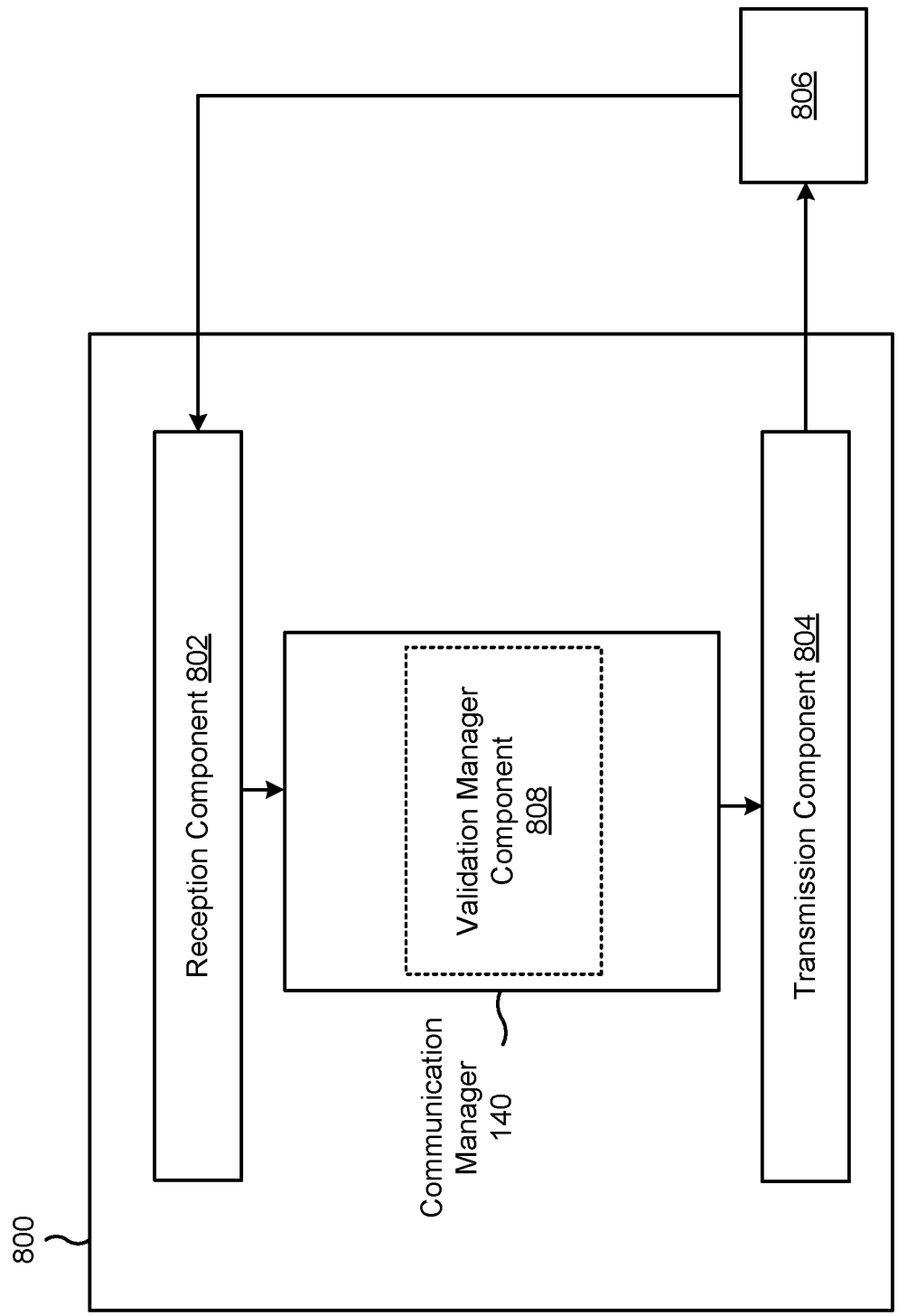
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a validation manager component 808, among other examples.

In some aspects, the apparatus 800 may be configured to perform one or more operations described herein in connection with FIGS. 4-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The validation manager component 808 may receive, by way of the reception component 802 and from a first network node, a first indication of satellite assistance information that is associated with a second network node, a second indication of first timing information that is associated with the satellite assistance information, and a third indication of second timing information that is associated with the satellite assistance information. The transmission component 804 may transmit an uplink signal to the second network node based at least in part on the validation manager component 808 validating the satellite assistance information using the second timing information.

The reception component 802 may receive, from the first network node, a handover command and transmitting the uplink signal is based at least in part on receiving the handover command.

The validation manager component 808 may determine uplink synchronization timing with the second network node based at least in part on the first indication of the satellite assistance information and the third indication of the second timing information received from the first network node, and transmitting the uplink signal is based at least in part on the uplink synchronization timing. In some aspects, the validation manager component 808 may validate use of the satellite assistance information for transmitting the uplink signal based at least in part on the second timing information, and transmitting the uplink signal is based at least in part on validating the satellite assistance information.

The validation manager component 808 may receive, by way of the reception component 802 and based at least in part on the first indication of the satellite assistance information, a satellite assistance information identifier that is associated with the satellite assistance information. Alternatively, or additionally, the validation manager component 808 may receive, by way of the reception component 802 and with the third indication of the second timing information, the satellite assistance information identifier.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
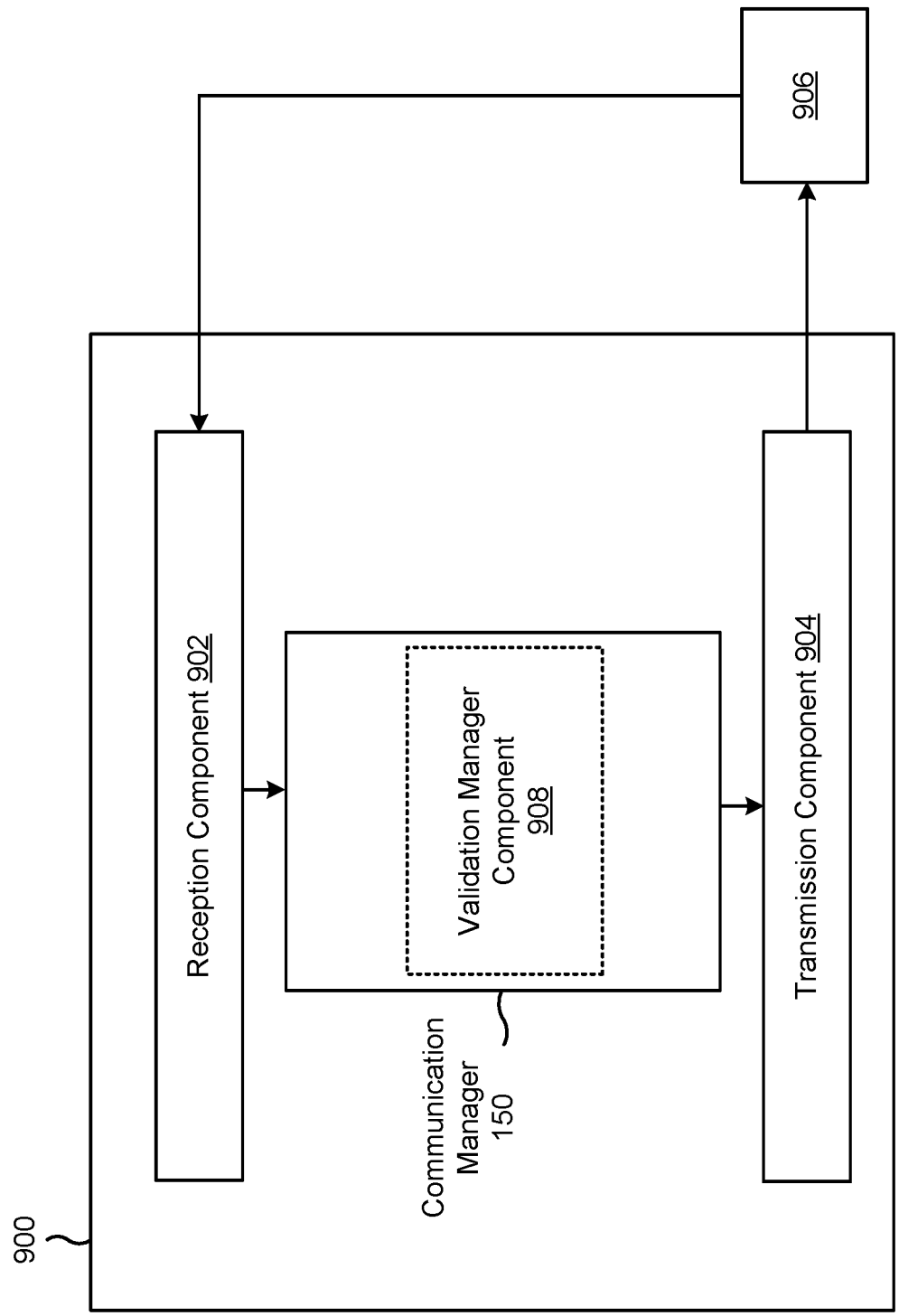
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a validation manager component 908, among other examples.

In some aspects, the apparatus 900 may be configured to perform one or more operations described herein in connection with FIGS. 4-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The validation manager component 908 may transmit, by way of the transmission component 904, a first indication of satellite assistance information that is associated with a second network node, a second indication of first timing information that is associated with the satellite assistance information, and a third indication of second timing information that is associated with the satellite assistance information. The communication manager 150 may perform a handover of a UE to the second network node based at least in part on the second timing information and the satellite assistance information associated with the second network node. In some aspects, the communication manager 150 may transmit, by way of the transmission component 904, a handover command to the UE.

The validation manager component 908 may transmit, by way of the transmission component 904 and based at least in part on the first indication of the satellite assistance information, a satellite assistance information identifier that is associated with the satellite assistance information. Alternatively, or additionally, the validation manager component 908 may transmit, by way of the transmission component 904 and with the third indication of the second timing information, the satellite assistance information identifier.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a first network node, a first indication of satellite assistance information that is associated with a second network node, a second indication of first timing information that is associated with the satellite assistance information, and a third indication of second timing information that is associated with the satellite assistance information; and transmitting an uplink signal to the second network node based at least in part on validating the satellite assistance information using the second timing information.

Aspect 2: The method of Aspect 1, wherein the satellite assistance information comprises at least one of: ephemeris data associated with the second network node, or one or more common timing advance parameters associated with the second network node.

Aspect 3: The method of any of Aspect 1 or Aspect 2, wherein receiving the first indication of the satellite assistance information comprises: receiving the first indication in a system information block (SIB), and wherein receiving the second indication of the first timing information comprises: receiving the second indication of the first timing information in the SIB.

Aspect 4: The method of any one of Aspects 1-3, wherein the first timing information comprises: a first epoch time; and a first validity duration that is based at least in part on the first epoch time.

Aspect 5: The method of Aspect 4, wherein the first validity duration is associated with validating use of the satellite assistance information for performing a neighbor cell measurement that is associated with the second network node.

Aspect 6: The method of any one of Aspects 1-5, wherein the second timing information comprises a second validity duration that is associated with validating the satellite assistance information for transmission of the uplink signal, and wherein the first validity duration and the second validity duration are based at least in part on the first epoch time.

Aspect 7: The method of any one of Aspects 3-6, wherein the SIB comprises an SIB 19 format.

Aspect 8: The method of any of Aspects 1-7, wherein the second timing information comprises: a second validity duration that is associated with validating the satellite assistance information for transmission of the uplink signal.

Aspect 9: The method of Aspect 8, wherein the second timing information comprises a second epoch time, and wherein the second validity duration is based at least in part on the second epoch time.

Aspect 10: The method of Aspect 8, wherein the first timing information comprises a first validity duration for validating use of the satellite assistance information for performing a neighbor cell measurement associated with the second network node, and wherein the third indication specifies, as the second validity duration, a fraction of the first validity duration.

Aspect 11: The method of Aspect 8, wherein the second validity duration is an absolute duration.

Aspect 12: The method of any of Aspects 1-11, further comprising: deriving an uplink timing advance parameter based at least in part on the satellite assistance information, wherein transmitting the uplink signal comprises: transmitting the uplink signal based at least in part on using the uplink timing advance parameter.

Aspect 13: The method of any of Aspects 1-12, wherein transmitting the uplink signal comprises: transmitting the uplink signal as part of a handover from the first network node to the second network node.

Aspect 14: The method of Aspect 13, wherein the handover is a conditional handover.

Aspect 15: The method of Aspect 13, further comprising: receiving, from the first network node, a handover command, wherein transmitting the uplink signal is based at least in part on receiving the handover command.

Aspect 16: The method of any one of Aspects 13-15, further comprising: determining uplink synchronization timing with the second network node based at least in part on the first indication of the satellite assistance information and the third indication of the second timing information received from the first network node, wherein transmitting the uplink signal is based at least in part on the uplink synchronization timing.

Aspect 17: The method of any one of Aspects 13-16, further comprising: validating use of the satellite assistance information for transmitting the uplink signal based at least in part on the second timing information, wherein transmitting the uplink signal is based at least in part on validating the satellite assistance information.

Aspect 18: The method of any of Aspects 1-17, wherein receiving the first indication of the satellite assistance information, the second indication of the first timing information, and the third indication of the second timing information comprises: receiving the first indication of the satellite assistance information, the second indication of the first timing information, and the third indication of the second timing information in at least one broadcast message.

Aspect 19: The method of any of Aspects 1-18, wherein receiving the first indication of the satellite assistance information, the second indication of the first timing information, and the third indication of the second timing information comprises: receiving the first indication of the satellite assistance information, the second indication of the first timing information, and the third indication of the second timing information in a single downlink transmission.

Aspect 20: The method of Aspect 19, wherein receiving the first indication of the satellite assistance information, the second indication of the first timing information, and the third indication of the second timing information comprises: receiving the first indication of the satellite assistance information, the second indication of the first timing information, and the third indication of the second timing information in one or more information elements.

Aspect 21: The method of any of Aspects 1-20, wherein receiving the first indication of the satellite assistance information, the second indication of the first timing information, and the third indication of the second timing information comprises: receiving the first indication and the second indication together in a system information block; and receiving the third indication in a downlink transmission that is separate from the system information block.

Aspect 22: The method of Aspect 21, wherein the downlink transmission that is separate from the system information block comprises at least one of: a radio resource control (RRC) message, a medium access control (MAC) control element (CE), downlink control information, or a handover message.

Aspect 23: The method of any of Aspects 1-22, further comprising: receiving, based at least in part on the first indication of the satellite assistance information, a satellite assistance information identifier that is associated with the satellite assistance information; and receiving, with the third indication of the second timing information, the satellite assistance information identifier.

Aspect 24: The method of Aspect 23, wherein validating the satellite assistance information using the second timing information is based at least in part on the satellite assistance information identifier.

Aspect 25: The method of Aspect 23 or Aspect 24, wherein receiving the first indication and the third indication comprises: receiving the first indication based at least in part on a first downlink transmission; and receiving the third indication based at least in part on a second downlink transmission.

Aspect 26: The method of any of Aspects 1-25, wherein the second network node is a first neighbor network node, and wherein the satellite assistance information comprises first satellite assistance information associated with the first neighbor network node and at least second satellite assistance information associated with a second neighbor network node.

Aspect 27: The method of Aspect 26, wherein the uplink signal is a first uplink signal, wherein the second timing information comprises a single validity duration, and wherein the single validity duration is associated with: validating the first satellite assistance information for transmitting the first uplink signal to the first neighbor network node; and validating the at least second satellite assistance information for transmitting a second uplink signal to the second neighbor network node.

Aspect 28: The method of Aspect 26, wherein the uplink signal is a first uplink signal, and wherein the second timing information comprises: a second validity duration that is associated with validating use of the first satellite assistance information for transmitting the first uplink signal to the first neighbor network node; and at least a third validity duration that is associated with validating use of the second satellite assistance information for transmitting a second uplink signal to the second neighbor network node.

Aspect 29: The method of any of Aspects 1-28, wherein the second indication of the first timing information comprises a first validity duration that is associated with validating the satellite assistance information for a neighbor cell measurement, and wherein the third indication indicates to use, as a second validity duration that is associated with validating the satellite assistance information for use in transmitting the uplink signal, the first validity duration.

Aspect 30: The method of Aspect 29, wherein the third indication is an explicit indication included in a downlink transmission.

Aspect 31: The method of Aspect 30, wherein the downlink transmission comprises a handover message.

Aspect 32: The method of Aspect 29, wherein the third indication is an implicit indication that is based at least in part on a downlink transmission omitting the second timing information.

Aspect 33: The method of Aspect 29, wherein the first network node and the second network node are co-located.

Aspect 34: A method of wireless communication performed by a first network node comprising: transmitting a first indication of satellite assistance information that is associated with a second network node, a second indication of first timing information that is associated with the satellite assistance information, and a third indication of second timing information that is associated with the satellite assistance information; and performing a handover of a user equipment (UE) to the second network node based at least in part on the second timing information and the satellite assistance information associated with the second network node.

Aspect 35: The method of Aspect 34, wherein the satellite assistance information comprises at least one of: ephemeris data associated with the second network node, or one or more common timing advance parameters associated with the second network node.

Aspect 36: The method of any of Aspect 34 or Aspect 35, wherein transmitting the first indication of the satellite assistance information that is associated with the second network node and the second indication of the first timing information that is associated with the satellite assistance information comprises: transmitting the first indication and the second indication in a system information block (SIB).

Aspect 37: The method of any one of Aspects 34-36, wherein the first timing information comprises: a first epoch time; and a first validity duration that is based at least in part on the first epoch time.

Aspect 38: The method of Aspect 37, wherein the first validity duration is associated with validating use of the satellite assistance information for performing a neighbor cell measurement that is associated with the second network node.

Aspect 39: The method of any one of Aspects 36-38, wherein the SIB comprises an SIB 19 format.

Aspect 40: The method of any of Aspects 34-39, wherein the second timing information comprises: a second validity duration that is associated with validating the satellite assistance information for transmission of an uplink signal to the second network node.

Aspect 41: The method of any one of Aspects 34-40, wherein the second timing information comprises a second epoch time, and wherein the second validity duration is based at least in part on the second epoch time.

Aspect 42: The method of Aspect 41, wherein the first timing information comprises a first validity duration for validating use of the satellite assistance information for performing a neighbor cell measurement associated with the second network node, and wherein the third indication specifies, as the second validity duration, a fraction of the first validity duration.

Aspect 43: The method of Aspect 41, wherein the second validity duration is an absolute duration.

Aspect 44: The method of any of Aspects 34-43, wherein the handover is based at least in part on a conditional handover.

Aspect 45: The method of any of Aspects 34-44, further comprising: transmitting a handover command to the UE.

Aspect 46: The method of any of Aspects 34-45, wherein transmitting the first indication of the satellite assistance information, the second indication of the first timing information, and the third indication of the second timing information comprises: transmitting the first indication of the satellite assistance information, the second indication of the first timing information, and the third indication of the second timing information in at least one broadcast message.

Aspect 47: The method of any of Aspects 34-46, wherein transmitting the first indication of the satellite assistance information, the second indication of the first timing information, and the third indication of the second timing information comprises: transmitting the first indication of the satellite assistance information, the second indication of the first timing information, and the third indication of the second timing information in a single downlink transmission.

Aspect 48: The method of Aspect 47, wherein transmitting the first indication of the satellite assistance information, the second indication of the first timing information, and the third indication of the second timing information comprises: transmitting the first indication of the satellite assistance information, the second indication of the first timing information, and the third indication of the second timing information in one or more information elements.

Aspect 49: The method of any of Aspects 34-48, wherein transmitting the first indication of the satellite assistance information, the second indication of the first timing information, and the third indication of the second timing information comprises: transmitting the first indication and the second indication together in a system information block; and transmitting the third indication in a downlink transmission that is separate from the system information block.

Aspect 50: The method of Aspect 49, wherein the downlink transmission that is separate from the system information block comprises at least one of: a radio resource control (RRC) message, a medium access control (MAC) control element (CE), downlink control information, or a handover message.

Aspect 51: The method of any of Aspects 34-50, further comprising: transmitting, based at least in part on the first indication of the satellite assistance information, a satellite assistance information identifier that is associated with the satellite assistance information; and transmitting, with the third indication of the second timing information, the satellite assistance information identifier.

Aspect 52: The method of Aspect 51, wherein transmitting the first indication and the third indication comprises: transmitting the first indication based at least in part on a first downlink transmission; and transmitting the third indication based at least in part on a second downlink transmission.

Aspect 53: The method of any of Aspects 34-52, wherein the second network node is a first neighbor network node, and wherein the satellite assistance information comprises first satellite assistance information associated with the first neighbor network node and at least second satellite assistance information associated with a second neighbor network node.

Aspect 54: The method of Aspect 53, wherein the second timing information comprises a single validity duration, and wherein the single validity duration is associated with: validating the first satellite assistance information for transmitting a first uplink signal to the first neighbor network node; and validating the at least second satellite assistance information for transmitting a second uplink signal to the second neighbor network node.

Aspect 55: The method of Aspect 53, wherein the second timing information comprises: a second validity duration that is associated with validating use of the first satellite assistance information for transmitting a first uplink signal to the first neighbor network node; and at least a third validity duration that is associated with validating use of the second satellite assistance information for transmitting a second uplink signal to the second neighbor network node.

Aspect 56: The method of any of Aspects 34-55, wherein the second indication of the first timing information comprises a first validity duration that is associated with validating the satellite assistance information for a neighbor cell measurement, and wherein the third indication indicates to use, as a second validity duration that is associated with validating the satellite assistance information for use in transmitting an uplink signal to the second network node, the first validity duration.

Aspect 57: The method of Aspect 56, wherein the third indication is an explicit indication included in a downlink transmission.

Aspect 58: The method of Aspect 57, wherein the downlink transmission comprises a handover message.

Aspect 59: The method of Aspect 56, wherein the third indication is an implicit indication that is based at least in part on a downlink transmission omitting the second timing information.

Aspect 60: The method of Aspect 56, wherein the first network node and the second network node are co-located.

Aspect 61: An apparatus for wireless communication at a device, comprising a processor; memory coupled with the processor; and instructions stored in the memory and executable by the processor to cause the apparatus to perform the method of one or more of Aspects 1-33.

Aspect 62: An apparatus for wireless communication at a device, comprising a processor; memory coupled with the processor; and instructions stored in the memory and executable by the processor to cause the apparatus to perform the method of one or more of Aspects 34-60.

Aspect 63: A device for wireless communication, comprising a memory and one or more processors coupled to the memory, the one or more processors configured to perform the method of one or more of Aspects 1-33.

Aspect 64: A device for wireless communication, comprising a memory and one or more processors coupled to the memory, the one or more processors configured to perform the method of one or more of Aspects 34-60.

Aspect 65: An apparatus for wireless communication, comprising at least one means for performing the method of one or more of Aspects 1-33.

Aspect 66: An apparatus for wireless communication, comprising at least one means for performing the method of one or more of Aspects 34-60.

Aspect 67: A non-transitory computer-readable medium storing code for wireless communication, the code comprising instructions executable by a processor to perform the method of one or more of Aspects 1-33.

Aspect 68: A non-transitory computer-readable medium storing code for wireless communication, the code comprising instructions executable by a processor to perform the method of one or more of Aspects 34-60.

Aspect 69: A non-transitory computer-readable medium storing a set of instructions for wireless communication, the set of instructions comprising one or more instructions that, when executed by one or more processors of a device, cause the device to perform the method of one or more of Aspects 1-33.

Aspect 70: A non-transitory computer-readable medium storing a set of instructions for wireless communication, the set of instructions comprising one or more instructions that, when executed by one or more processors of a device, cause the device to perform the method of one or more of Aspects 34-60.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, which are configured, individually or in any combination, to:
      receive, from a first network node, a first indication of satellite assistance information that is associated with a second network node, a second indication of first timing information that is associated with the satellite assistance information, and a third indication of second timing information that is associated with the satellite assistance information;
      perform, using the satellite assistance information, a neighbor cell measurement that is associated with the second network node based on validating the satellite assistance information using the first timing information;
      validate, after performing the neighbor cell measurement using the satellite assistance information, the satellite assistance information using the second timing information; and
      transmit an uplink signal to the second network node based at least in part on validating the satellite assistance information using the second timing information.

2. The apparatus of claim 1, wherein the satellite assistance information comprises at least one of:
   ephemeris data associated with the second network node, or
   one or more common timing advance parameters associated with the second network node.

3. The apparatus of claim 1, wherein the one or more processors, to receive the first indication of the satellite assistance information, are configured to:
   receive the first indication in a system information block (SIB), and
   wherein the one or more processors, to receive the second indication of the first timing information, are configured to:
      receive the second indication of the first timing information in the SIB.

4. The apparatus of claim 1, wherein the first timing information comprises:
   a first epoch time; and
   a first validity duration that is based at least in part on the first epoch time.

5. The apparatus of claim 4, wherein the first validity duration is associated with validating use of the satellite assistance information for performing the neighbor cell measurement that is associated with the second network node.

6. The apparatus of claim 1, wherein the second timing information comprises:
a second validity duration that is associated with validating the satellite assistance information for transmission of the uplink signal.

7. The apparatus of claim 1, wherein the one or more processors, to transmit the uplink signal, are configured to:
transmit the uplink signal as part of a handover from the first network node to the second network node.

8. The apparatus of claim 1, wherein the one or more processors are further configured to:
determine uplink synchronization timing with the second network node based at least in part on the first indication of the satellite assistance information and the third indication of the second timing information received from the first network node,
wherein the one or more processors, to transmit the uplink signal, are configured to transmit the uplink signal based at least in part on the uplink synchronization timing.

9. The apparatus of claim 1, wherein the one or more processors are further configured to:
validate use of the satellite assistance information for transmitting the uplink signal based at least in part on the second timing information,
wherein the one or more processors, to transmit the uplink signal, are configured to transmit the uplink signal based at least in part on validating the satellite assistance information.

10. The apparatus of claim 1, wherein the one or more processors, to receive the first indication of the satellite assistance information, the second indication of the first timing information, and the third indication of the second timing information, are configured to:
receive the first indication of the satellite assistance information, the second indication of the first timing information, and the third indication of the second timing information in at least one broadcast message.

11. The apparatus of claim 1, wherein the one or more processors, to receive the first indication of the satellite assistance information, the second indication of the first timing information, and the third indication of the second timing information, are configured to:
receive the first indication and the second indication together in a system information block; and
receive the third indication in a downlink transmission that is separate from the system information block.

12. The apparatus of claim 1, wherein the one or more processors are further configured to:
receive, based at least in part on the first indication of the satellite assistance information, a satellite assistance information identifier that is associated with the satellite assistance information; and
receive, with the third indication of the second timing information, the satellite assistance information identifier.

13. A method of wireless communication performed by a user equipment (UE), comprising:
receiving, from a first network node, a first indication of satellite assistance information that is associated with a second network node, a second indication of first timing information that is associated with the satellite assistance information, and a third indication of second timing information that is associated with the satellite assistance information;
performing, using the satellite assistance information, a neighbor cell measurement that is associated with the second network node based on validating the satellite assistance information using the first timing information;
validating, after performing the neighbor cell measurement using the satellite assistance information, the satellite assistance information using the second timing information; and
transmitting an uplink signal to the second network node based at least in part on validating the satellite assistance information using the second timing information.

14. The method of claim 13, further comprising:
determining uplink synchronization timing with the second network node based at least in part on the first indication of the satellite assistance information and the third indication of the second timing information received from the first network node,
wherein transmitting the uplink signal is based at least in part on the uplink synchronization timing.

15. The method of claim 13, wherein the second network node is a first neighbor network node,
wherein the satellite assistance information comprises first satellite assistance information associated with the first neighbor network node and at least second satellite assistance information associated with a second neighbor network node,
wherein the uplink signal is a first uplink signal,
wherein the second timing information comprises a single validity duration, and
wherein the single validity duration is associated with:
validating the first satellite assistance information for transmitting the first uplink signal to the first neighbor network node; and
validating the at least second satellite assistance information for transmitting a second uplink signal to the second neighbor network node.

16. The method of claim 13, wherein the second network node is a first neighbor network node,
wherein the satellite assistance information comprises first satellite assistance information associated with the first neighbor network node and at least second satellite assistance information associated with a second neighbor network node,
wherein the uplink signal is a first uplink signal, and
wherein the second timing information comprises:
a second validity duration that is associated with validating use of the first satellite assistance information for transmitting the first uplink signal to the first neighbor network node; and
at least a third validity duration that is associated with validating use of the second satellite assistance information for transmitting a second uplink signal to the second neighbor network node.

17. A non-transitory computer-readable medium storing a set of instructions, the set of instructions comprising:
one or more instructions that, when executed by one or more processors of a user equipment (UE), cause the UE to:
receive, from a first network node, a first indication of satellite assistance information that is associated with a second network node, a second indication of first timing information that is associated with the satellite assistance information, and a third indication of second timing information that is associated with the satellite assistance information;
perform, using the satellite assistance information, a neighbor cell measurement that is associated with the second network node based on validating the satellite assistance information using the first timing information;

validate, after performing the neighbor cell measurement using the satellite assistance information, the satellite assistance information using the second timing information; and transmit an uplink signal to the second network node based at least in part on validating the satellite assistance information using the second timing information.

18. The non-transitory computer-readable medium of claim 17, wherein the satellite assistance information comprises at least one of:

ephemeris data associated with the second network node, or one or more common timing advance parameters associated with the second network node.

19. The non-transitory computer-readable medium of claim 17, wherein the one or more instructions, that cause the UE to receive the first indication of the satellite assistance information, cause the UE to:

receive the first indication in a system information block (SIB), and wherein the one or more instructions, that cause the UE to receive the second indication of the first timing information, cause the UE to:

receive the second indication of the first timing information in the SIB.

20. The non-transitory computer-readable medium of claim 17, wherein the first timing information comprises:

a first epoch time; and a first validity duration that is based at least in part on the first epoch time.

21. The non-transitory computer-readable medium of claim 20, wherein the first validity duration is associated with validating use of the satellite assistance information for performing the neighbor cell measurement that is associated with the second network node.

22. The non-transitory computer-readable medium of claim 17, wherein the second timing information comprises:

a second validity duration that is associated with validating the satellite assistance information for transmission of the uplink signal.

23. The non-transitory computer-readable medium of claim 17, wherein the one or more instructions, that cause the UE to transmit the uplink signal, cause the UE to:

transmit the uplink signal as part of a handover from the first network node to the second network node.

24. The non-transitory computer-readable medium of claim 17, wherein the one or more instructions further cause the UE to:

determine uplink synchronization timing with the second network node based at least in part on the first indication of the satellite assistance information and the third indication of the second timing information received from the first network node, wherein the one or more instructions, that cause the UE to transmit the uplink signal, cause the UE to transmit the uplink signal based at least in part on the uplink synchronization timing.

25. The non-transitory computer-readable medium of claim 17, wherein the one or more instructions further cause the UE to:

validate use of the satellite assistance information for transmitting the uplink signal based at least in part on the second timing information, wherein the one or more instructions, that cause the UE to transmit the uplink signal, cause the UE to transmit the uplink signal based at least in part on validating the satellite assistance information.

26. The non-transitory computer-readable medium of claim 17, wherein the one or more instructions, that cause the UE to receive the first indication of the satellite assistance information, the second indication of the first timing information, and the third indication of the second timing information, cause the UE to:

receive the first indication of the satellite assistance information, the second indication of the first timing information, and the third indication of the second timing information in at least one broadcast message.

27. The non-transitory computer-readable medium of claim 17, wherein the one or more instructions, that cause the UE to receive the first indication of the satellite assistance information, the second indication of the first timing information, and the third indication of the second timing information, cause the UE to:

receive the first indication and the second indication together in a system information block; and receive the third indication in a downlink transmission that is separate from the system information block.

28. The non-transitory computer-readable medium of claim 17, wherein the one or more instructions further cause the UE to:

receive, based at least in part on the first indication of the satellite assistance information, a satellite assistance information identifier that is associated with the satellite assistance information; and receive, with the third indication of the second timing information, the satellite assistance information identifier.

29. An apparatus, comprising:

means for receiving, from a first network node, a first indication of satellite assistance information that is associated with a second network node, a second indication of first timing information that is associated with the satellite assistance information, and a third indication of second timing information that is associated with the satellite assistance information;

means for performing, using the satellite assistance information, a neighbor cell measurement that is associated with the second network node based on validating the satellite assistance information using the first timing information;

means for validating, after performing the neighbor cell measurement using the satellite assistance information, the satellite assistance information using the second timing information; and means for transmitting an uplink signal to the second network node based at least in part on validating the satellite assistance information using the second timing information.

30. The apparatus of claim 29, wherein the satellite assistance information comprises at least one of:

ephemeris data associated with the second network node, or one or more common timing advance parameters associated with the second network node.

* * * * *